(12) United States Patent
Breed

(10) Patent No.: US 6,918,459 B2
(45) Date of Patent: Jul. 19, 2005

(54) METHOD AND APPARATUS FOR DEPLOYING AIRBAGS

(75) Inventor: David S. Breed, Boonton Township, NJ (US)

(73) Assignee: Automotive Technologies International, Inc., Denville, NJ (US)

( * ) Notice: Subject to any disclaimer, the term of this patent is extended or adjusted under 35 U.S.C. 154(b) by 108 days.

(21) Appl. No.: 10/180,466

(22) Filed: Jun. 26, 2002

(65) Prior Publication Data

US 2002/0166710 A1 Nov. 14, 2002

Related U.S. Application Data

(63) Continuation-in-part of application No. 10/097,082, filed on Mar. 13, 2002, which is a continuation-in-part of application No. 09/825,173, filed on Apr. 3, 2001, now Pat. No. 6,623,033, which is a continuation-in-part of application No. 09/024,085, filed on Feb. 17, 1998, now Pat. No. 6,209,909, which is a continuation-in-part of application No. 08/247,760, filed on May 23, 1994, now abandoned, and a continuation-in-part of application No. 09/307,883, filed on May 10, 1999, now Pat. No. 6,343,810.

(51) Int. Cl.$^7$ .............................................. B60R 21/22
(52) U.S. Cl. ...................... 180/282; 280/730.1; 280/734
(58) Field of Search ................................ 180/274, 282; 280/730.1, 730.2, 734

(56) References Cited

U.S. PATENT DOCUMENTS

| | | | |
|---|---|---|---|
| 2,970,862 A | 2/1961 | Racine | |
| 3,177,966 A | 4/1965 | Schoeffler et al. | |
| 3,322,458 A | 5/1967 | Bachmann | |
| 3,735,398 A | 5/1973 | Ross | 280/735 |
| 3,741,584 A | 6/1973 | Arai | 280/735 |
| 3,822,076 A | 7/1974 | Mercier et al. | 293/107 |
| 3,861,710 A | 1/1975 | Okubo | 280/735 |
| 3,874,695 A | 4/1975 | Abe et al. | 280/735 |
| 3,900,210 A | 8/1975 | Lohr et al. | 280/729 |
| 3,922,030 A | 11/1975 | Stedman | |
| 3,951,430 A | 4/1976 | Schwanz et al. | |
| 3,981,518 A | 9/1976 | Pulling | |
| 4,243,248 A | 1/1981 | Scholz et al. | 280/735 |
| 4,257,705 A | 3/1981 | Hosoe et al. | 356/1 |

(Continued)

FOREIGN PATENT DOCUMENTS

| | | | |
|---|---|---|---|
| DE | 2922273 | 1/1981 | 280/735 |
| DE | 43 20 147 | 1/1994 | 280/735 |
| EP | 0210079 | 1/1987 | 280/735 |

(Continued)

OTHER PUBLICATIONS

Learned Classification of Sonar Targets Using a Massively Parallel Network, R. Paul Gorman and Terrence J. Sejnowski, III Transactions on Acoustics, Speech & Signal Processing, vol. 36, No. 7, Jul. 1968, pp. 1135–1140.

(Continued)

*Primary Examiner*—Paul N. Dickson
*Assistant Examiner*—Laura B. Rosenberg
(74) *Attorney, Agent, or Firm*—Brian Roffe

(57) ABSTRACT

Apparatus and method for deploying airbags in a vehicle in which a first inflatable airbag protects an occupant in a seating location during a crash and a second inflatable airbag moves the occupant in the seating location away from an interior surface of the vehicle upon inflation. A crash sensor system determines that a crash involving the vehicle will occur or is occurring and initiates inflation of the first and second airbags. The second airbag may be inflated prior to inflation of the first airbag such that inflation of the second airbag causes the occupant to be moved away from the interior surface of the vehicle and into a better position for deployment of the first airbag. In one exemplary embodiment, the first airbag is a side curtain airbag and the second airbag is arranged in a door of the vehicle to move the occupant away from the door.

41 Claims, 33 Drawing Sheets

U.S. PATENT DOCUMENTS

| | | |
|---|---|---|
| 4,381,829 A | 5/1983 | Montaron |
| 4,396,220 A | 8/1983 | Dieckmann et al. |
| 4,625,329 A | 11/1986 | Ishikawa et al. ............ 180/271 |
| 4,792,188 A | 12/1988 | Kawashima |
| 4,924,774 A | 5/1990 | Lenzen |
| 4,966,388 A | 10/1990 | Warner et al. .......... 280/730 A |
| 4,984,651 A | 1/1991 | Grosch et al. |
| 5,008,946 A | 4/1991 | Ando ......................... 180/271 |
| 5,022,707 A | 6/1991 | Beauvais et al. |
| 5,112,079 A | 5/1992 | Haland et al. ........... 280/730.2 |
| 5,145,208 A * | 9/1992 | Hoagland et al. .......... 280/734 |
| 5,149,165 A | 9/1992 | Woolley .................... 296/68.1 |
| 5,167,421 A | 12/1992 | Yunzhao |
| 5,231,253 A | 7/1993 | Breed et al. .......... 200/61.45 R |
| 5,249,157 A | 9/1993 | Taylor ........................ 340/903 |
| 5,251,931 A | 10/1993 | Semchena et al. |
| 5,282,134 A | 1/1994 | Gioutsos et al. ....... 364/424.05 |
| 5,285,188 A | 2/1994 | Yoshida ...................... 280/735 |
| 5,307,136 A | 4/1994 | Saneyoshi ................... 180/167 |
| 5,328,234 A | 7/1994 | Daniel et al. |
| 5,330,226 A | 7/1994 | Gentry et al. ............... 280/739 |
| 5,333,899 A * | 8/1994 | Witte ...................... 280/730.2 |
| 5,344,204 A | 9/1994 | Yunzhao |
| 5,377,108 A | 12/1994 | Nishio ................... 364/424.05 |
| 5,394,326 A | 2/1995 | Liu ........................ 364/424.05 |
| 5,484,166 A * | 1/1996 | Mazur et al. ............... 280/735 |
| 5,567,006 A | 10/1996 | McCarthy |
| 5,583,771 A | 12/1996 | Lynch et al. ........... 364/424.05 |
| 5,623,246 A * | 4/1997 | Kruse et al. ................ 340/438 |
| 5,667,246 A | 9/1997 | Miller, III ................... 280/806 |
| 5,785,347 A | 7/1998 | Adolph et al. .............. 280/735 |
| 5,810,427 A | 9/1998 | Hartmann et al. .......... 296/189 |
| 5,951,073 A | 9/1999 | Hall ............................ 293/119 |
| 5,967,573 A | 10/1999 | Wang ......................... 293/119 |
| 6,056,336 A | 5/2000 | Balgobin ................... 293/107 |
| 6,059,330 A | 5/2000 | Moffett et al. .............. 293/118 |
| 6,106,038 A | 8/2000 | Dreher ....................... 293/118 |
| 6,123,355 A * | 9/2000 | Sutherland ............... 280/728.2 |
| 6,174,008 B1 | 1/2001 | Kramer et al. ............. 293/118 |
| 6,209,909 B1 | 4/2001 | Breed ......................... 280/735 |
| 6,209,910 B1 * | 4/2001 | Nagae ........................ 280/735 |
| 6,217,060 B1 * | 4/2001 | Mangold et al. ......... 280/730.2 |
| 6,218,738 B1 * | 4/2001 | Fujishima ................. 307/10.1 |
| 6,224,120 B1 | 5/2001 | Eipper et al. ............... 293/118 |
| 6,302,436 B1 * | 10/2001 | Eyrainer .................. 280/730.2 |
| 6,343,810 B1 | 2/2002 | Breed ...................... 280/730.2 |

FOREIGN PATENT DOCUMENTS

| | | | |
|---|---|---|---|
| EP | 0568017 | 11/1993 | |
| GB | 1333269 | 10/1973 | |
| GB | 2289786 | 11/1995 | |
| JP | 4293641 | 10/1992 | ................ 180/274 |
| JP | 5143897 | 6/1993 | ................ 340/903 |
| JP | 06055985 A | 3/1994 | |
| JP | 7047915 | 2/1995 | |
| JP | 7081520 | 3/1995 | |
| JP | 7117623 | 5/1995 | |
| WO | 8605149 | 9/1986 | ................ 180/274 |

OTHER PUBLICATIONS

Analysis of Hidden Units in a Layered Network Trained to Classify Sonar Targets, Neural networks, R. Paul Gorman and Terrence J. Sejnowski, vol. 1, 1988, pp. 75–89.

Trends in Sensing Side Impacts, V. Castelli and D. Breed, SAE Paper No. 890603, Feb. 27–Mar. 3, 1989.

Sensing Side Impacts, D. Breed, W.T. Sanders, V. Castelli, SAE Paper No. 940561, Feb. 28–Mar. 3, 1994.

Side Impact Airbag System Technology, D. Breed, International Body Engineering Conference '94, Sep. 26–29, 1994.

* cited by examiner

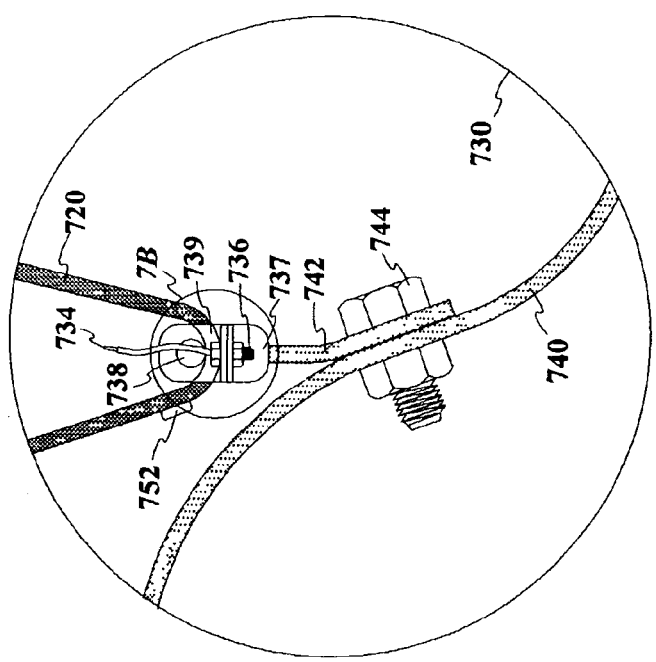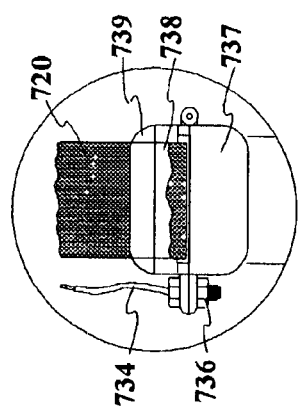
FIG. 7A
FIG. 7B

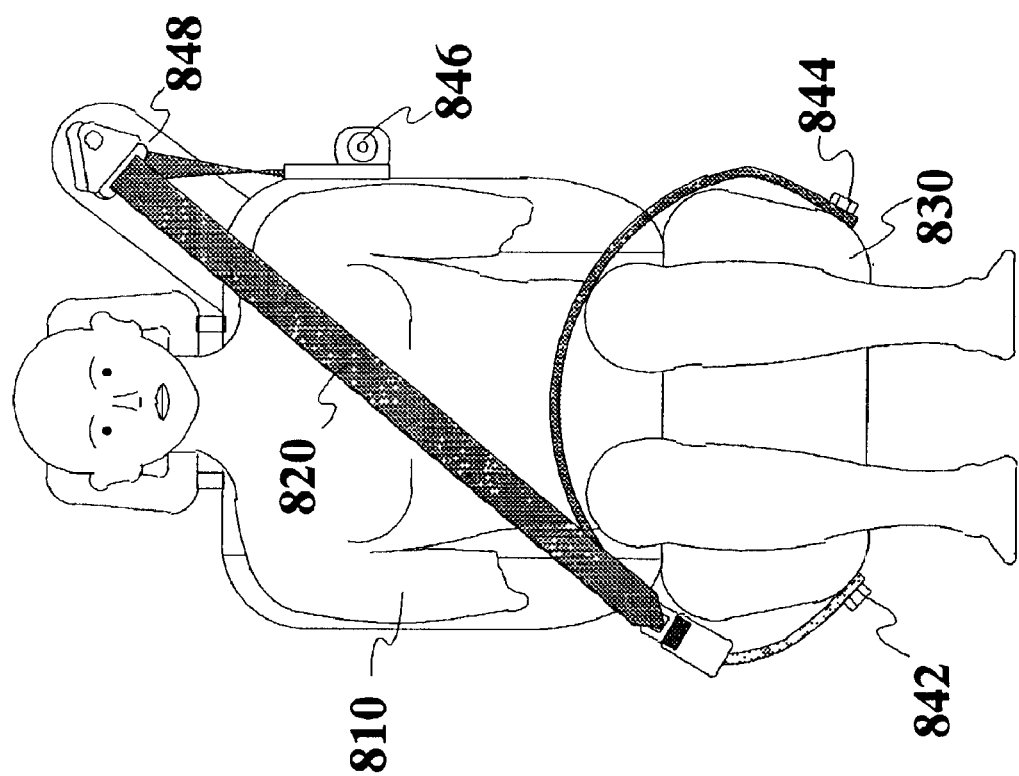

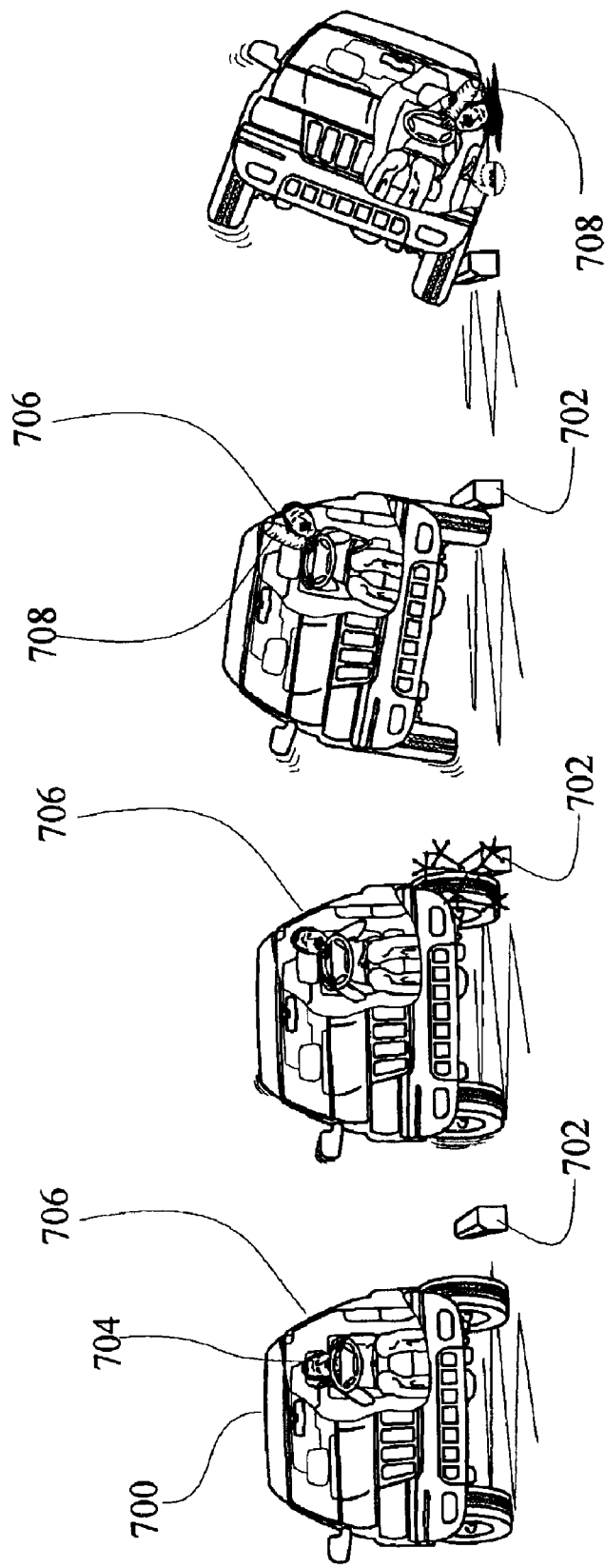

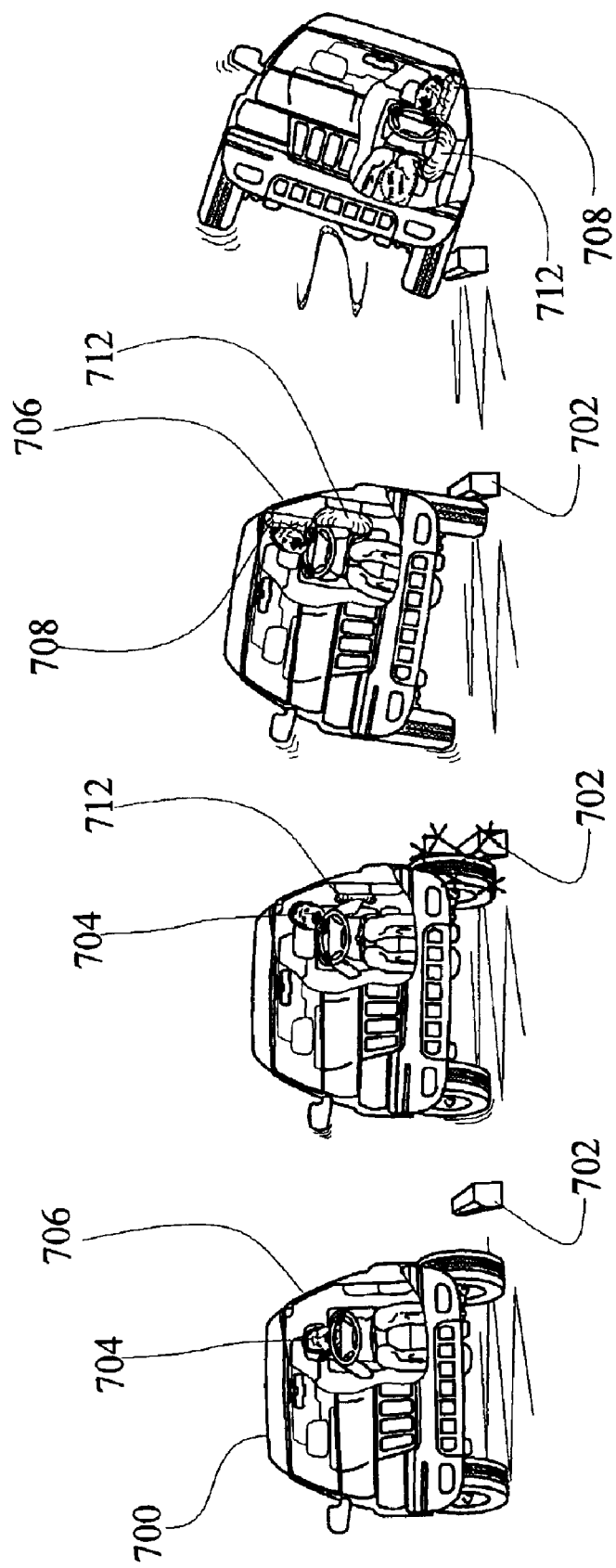

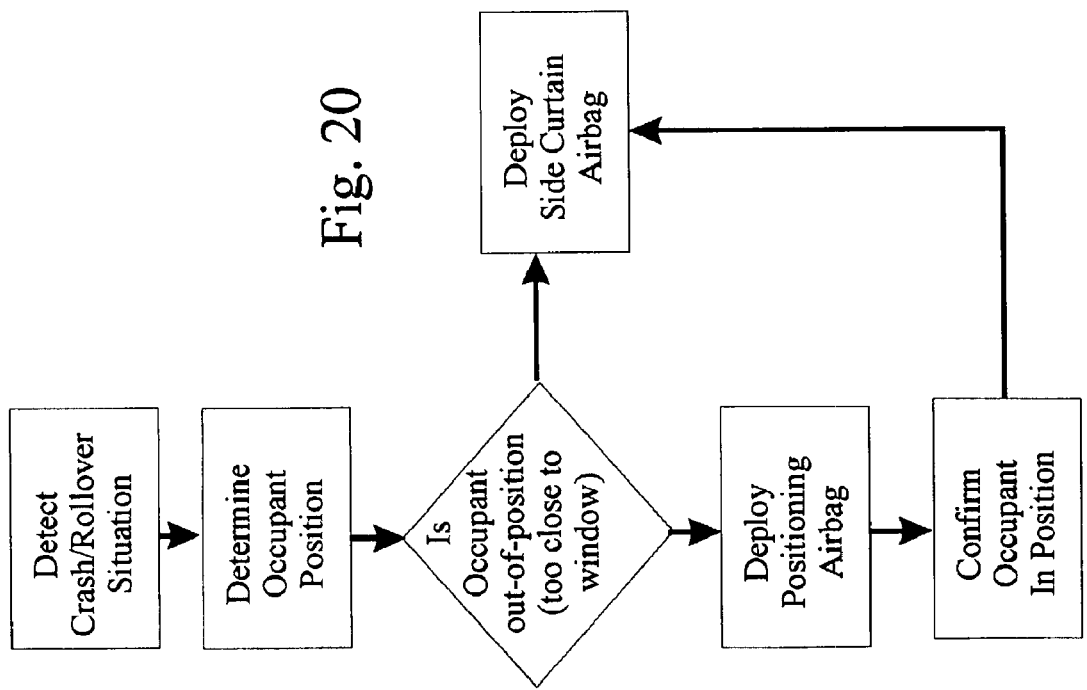

METHOD AND APPARATUS FOR DEPLOYING AIRBAGS

CROSS REFERENCE TO RELATED APPLICATIONS

This application is a continuation-in-part of U.S. patent application Ser. No. 10/097,082 filed Mar. 13, 2002 which in turn is a continuation-in-part of U.S. patent application Ser. No. 09/825,173 filed Apr. 3, 2001 now U.S. Pat. No. 6,623,033 which in turn is:

1) a continuation-in-part of U.S. patent application Ser. No. 09/024,085 filed Feb. 17, 1998, now U.S. Pat. No. 6,209,909, which is a continuation-in-part of U.S. patent application Ser. No. 08/247,760 filed May 23, 1994 now abandoned ; and 2) a continuation-in-part of U.S. patent application Ser. No. 09/307,883 filed May 10, 1999, now U.S. Pat. No. 6,343,810, which is also a continuation-in-part of the '085 application. These applications are incorporated by reference herein in their entirety.

This application is related to, on the grounds that it includes common subject matter, U.S. patent application Ser. No. 10/097,086 filed Mar. 13, 2002.

FIELD OF THE INVENTION

The present invention relates generally to apparatus and methods for deploying airbags in a vehicle and more particularly to apparatus and methods wherein one or more airbags are deployed to position an occupant for subsequent deployment of another airbag. The airbags which are deployed to position the occupant are generally referred to herein as "positioning" airbags.

The present invention also relates to combined airbag inflation and occupant displacement enabling method and apparatus in which an occupant is permitted to be displaced in conjunction with the inflation of the airbag.

The present invention also relates to airbag inflation control systems and methods and more particularly, to inflation control systems and methods including multiple crash sensors, each of which affects the accumulation of gas in an airbag.

BACKGROUND OF THE INVENTION

Frontal impacts were the number one killer of vehicle occupants in automobile accidents with about 16,000 fatalities each year. Side impacts were the second cause of automobile related deaths with about 8,000 fatalities each year. The number of fatalities in frontal impacts as well as side impacts has been decreasing due to the introduction of airbags and mandatory seatbelt use laws.

Several automobile manufacturers are now using side impact airbags to attempt to reduce the number of people killed or injured in side impacts. The side impact problem is considerably more difficult to solve in this way than the frontal impact problem due to the lack of space between the occupant and the side door and to the significant intrusion of the side door into the passenger compartment which typically accompanies a side impact.

Some understanding of the severity of the side impact problem can be obtained by a comparison with frontal impacts. In the Federal Motor Vehicle Safety Standard (FMVSS) 208 49 kph crash test which applies to frontal impacts, the driver, if unrestrained, will impact the steering wheel at about 30 kph. With an airbag and a typical energy absorbing steering column, there is about 40 cm to about 50 cm of combined deflection of the airbag and steering column to absorb this 30 kph difference in relative velocity between the driver and vehicle interior. Also, there is usually little intrusion into the passenger compartment to reduce this available space.

In the FMVSS 214 standard crash for side impacts, the occupant, whether restrained or not, is impacted by the intruding vehicle door also at about 30 kph. In this case there is only about 10 to 15 cm of space available for an airbag to absorb the relative velocity between the occupant and the vehicle interior. In addition, the human body is more vulnerable to side impacts than frontal impacts and there is usually significant intrusion into the passenger compartment. A more detailed discussion of side impacts can be found in a paper by Breed et al, "Sensing Side Impacts", Society of Automotive Engineers Paper No. 940651, 1994, which is incorporated by reference herein.

Ideally, an airbag for side impact protection would displace the occupant away from the intruding vehicle door in an accident and create the required space for a sufficiently large airbag. Sensors used for side impact airbags, however, usually begin sensing the crash only at the beginning of the impact at which time there is insufficient time remaining to move the occupant before he is impacted by the intruding door. Even if the airbag were inflated instantaneously, it is still not possible to move the occupant to create the desired space without causing serious injury to the occupant. The problem is that the sensor that starts sensing the crash when the impact has begun, is already too late, i.e., once the sensor detects the crash, it is usually too late to properly inflate the airbag.

There has been discussion over the years in the vehicular safety community about the use of anticipatory sensors so that the side impact accident could be sensed before it occurs. Prior to 1994, this was not practical due to the inability to predict the severity of the accident prior to the impact. A heavy truck, for example, or a tree is a much more severe accident at low velocity than a light vehicle or motorcycle at high velocity. Further, it was not possible to differentiate between these different accidents with a high degree of certainty.

Once a sufficiently large airbag is deployed in a side impact and the driver displaced away from the door and the steering wheel, he will no longer be able to control the vehicle that could in itself cause a serious accident. It is critically important, therefore, that such an airbag not be deployed unless there is great certainty that the driver would otherwise be seriously injured or killed by the side impact. Anticipatory sensors have heretofore not been used because of their inability to predict the severity of the accident. As discussed more fully below, the present invention solves this problem and therefore makes anticipatory sensing practical. This permits side impact airbag systems that can save a significant percentage of the people who would otherwise be killed as well as significantly reducing the number and severity of injuries. This is accomplished through the use of pattern recognition technologies such as neural networks such as discussed in U.S. Pat. No. 5,829,782, incorporated by reference herein.

Neural networks, and more recently modular neural networks, are capable of pattern recognition with a speed, accuracy and efficiency heretofore not possible. It is now possible, for example, to recognize that the front of a truck or another car is about to impact the side of a vehicle when it is one to three meters or more away. This totally changes the side impact strategy since there is now time to inflate a large airbag and push the occupant out of the way of the soon to be intruding vehicle. Naturally, not all side impacts are of sufficient severity to warrant this action and therefore, there will usually be a dual inflation system as described in more detail below.

Although the main application for anticipatory sensors is in side impacts, frontal impact anticipatory sensors can also be used to identify the impacting object before the crash occurs. Prior to going to a full frontal impact anticipatory sensor system, neural networks can be used to detect many frontal impacts using data in addition to the output of the normal crash sensing accelerometer. Simple radar or acoustic imaging, for example, can be added to current accelerometer based systems to give substantially more information about the crash and the impacting object than possible from the acceleration signal alone.

The side impact anticipatory sensor of this invention can use any of a variety of technologies including optical, radar (including noise radar, Micropower inpulse radar, and ultra wideband radar), acoustical, infrared or a combination of these. The sensor system typically contains a neural network processor to make the discrimination however a simulated neural network, a fuzzy logic or other algorithm operating on a microprocessor can also be used.

With respect to prior art related to the subject matter of this application, reference is made to European Patent Publication No. 0 210 079 (Davis). Davis describes, inter alia, a radar system for use in connection with an airbag deployment apparatus to prevent injury to passengers when impact with an approaching object is imminent. Voltage level inputs representative of the distance between an object and the vehicle, the approach rate of the object with respect to the vehicle, the vehicle speed and driving monitor inputs, e.g., steering angles, turning rates and acceleration/deceleration, are all generated by appropriate detectors, weighted according to their importance to a normal vehicle operators' sensed safe or danger levels and then the weighted input voltages are summed to provide an "instantaneous voltage level". This instantaneous voltage level is compared with a predetermined voltage level and if the instantaneous voltage level falls within a predetermined safe zone, output signals are not produced. On the other hand, if the instantaneous voltage level falls outside of the safe zone, i.e., within a danger zone, then the system can be designed to initiate deployment of the airbag on the additional condition that the vehicle speed is above a predetermined level. For example, the system can be programmed to deploy the airbag when the vehicle speed is between 35 and 204 miles per hour at a time of about 0.2 second prior to impact thereby enabling the airbag sufficient time to fully inflate.

As far as structure, Davis includes a radar system that includes an antenna assembly, a signal-processing unit and an output monitor. Davis relies on a radar signal generated by an antenna in the antenna assembly and which causes a return signal to be produced upon reflection of the radar signal against the approaching object. The return signal is received by a transceiver to be processed further in order to determine the distance between the object and the vehicle and the rate the object is approaching the vehicle. The return signal from the radar signal generated by the antenna is a single pulse, i.e., a single pixel. The elapsed time between the emission of the radar signal by the antenna and the receipt of the return signal by the transceiver determines the distance between the object and the vehicle and based on the elapsed time for a series of radar signals generated at set intervals, it is possible to determine the approach rate of the object relative to the vehicle.

In operation, the approach rate of the object relative to the vehicle, the distance between the object and the vehicle, the vehicle speed as well as other driving parameters are converted to voltage levels. Davis then uses an algorithm to weigh the voltage levels and compare the voltage levels to predetermined conditions for which airbag deployment is desired. If the conditions are satisfied by the results of the algorithm operating on the weighted voltage levels, then the airbag is deployed. In one embodiment, by appropriate manipulation of the voltage levels, false-triggering of the airbag can be prevented for impacts with objects smaller than a motorcycle, i.e., the voltage corresponding to a motorcycle at a certain distance from the vehicle is smaller than the voltage corresponding to a truck, for example at that same distance.

Davis does not attempt to recognize any pattern of reflected waves, i.e., a pattern formed from a plurality of waves received over a set period of time, from many pixels simultaneously (light and CCDs) or of the time series of ultrasonic waves. A tree, for example can have a smaller radar reflection (lower voltage in Davis) than a motorcycle but would have a different reflected pattern of waves (as detected in the present invention). Thus, in contrast to the inventions described herein, Davis does not identify the object exterior of the vehicle based on a received pattern of waves unique to that object, i.e., each different object will provide a distinct pattern of reflected or generated waves. The radar system of Davis is incapable of processing a pattern of waves, i.e., a plurality of waves received over a period of time, and based on such pattern, identify the object exterior of the vehicle. Rather, Davis can only differentiate objects based on the intensity of the. signal.

International Publication No. WO 86/05149 (Karr et al.) describes a device to protect passengers in case of a frontal or rear collision. The device includes a measurement device mounted in connection with the vehicle to measure the distance or speed of the vehicle in relation to an object moving into the range of the vehicle, e.g., another vehicle or an obstacle. In the event that prescribed values for the distance and/or relative speed are not met or exceeded, i.e., which is representative of a forthcoming crash, a control switch activates the protection and warning system in the vehicle so that by the time the crash occurs, the protection and warning system has developed its full protective effect. Karr et al. is limited to frontal crashes and rear crashes and does not appear to even remotely relate to side impacts. Thus, Karr et al. only shows the broad concept of anticipatory sensing in conjunction with frontal and rear crashes.

U.S. Pat. No. 4,966,388 (Warner et al.) relates to an inflatable system for side impact crash protection. The system includes a folded, inflatable airbag mounted within a door of the vehicle, an impact sensor also mounted within the door and an inflator coupled to the impact sensor and in flow communication with the airbag so that upon activation of the inflator by the impact sensor during a crash, the airbag is inflated.

U.S. Pat. No. 3,741,584 (Arai) shows a pressurized air container and two air lines leading to a protective air bag. An air line passes through a first valve which is controlled by an anticipatory sensor and the other air line passes through a second valve controlled by an impact detector. The purpose of having two sensors associated with different valves is to ensure that the protective bag will inflate even if one of the crash sensors does not operate properly.

U.S. Pat. No. 3,861,710 (Okubo) shows an airbag inflation system with a single airbag which is partially inflated based on a signal from an obstacle detecting sensor and then fully inflated based on a signal from an impact detecting sensor. The obstacle detecting sensor controls release of gas from a first gas supply source into the gas bag whereas the impact detecting sensor controls release of gas from a second gas supply source into the gas bag. The first gas supply source includes a first gas container filled with a proper volume of gas for inflating the gas bag to a semi-expanded condition, a first valve mechanism, a pipe between the first gas container and the first valve mechanism and a pipe between the first valve mechanism and the gas bag. The second gas supply source includes a second gas container filled with gas in a volume supplementing the volume of gas in the first gas container so that the contents of both gas containers will fully inflate the gas bag, a second valve mechanism, a pipe between the second gas container and the second valve mechanism and a pipe between the first valve mechanism and the gas bag.

U.S. Pat. No. 3,874,695 (Abe et al.) shows an inflating arrangement including two inertia-responsive switches and coupled gas-generators. The gas-generators are triggered by the switches to inflate an airbag. The switches are both crash sensors and measured acceleration produced during the collision, and thus are not anticipatory sensors. The purpose of the two switches operative to trigger respective gas-generators is to enable the airbag to be inflated to different degrees. For example, if the crash involving the vehicle is a low speed crash, then only switch is actuated and gas-generated is triggered and the airbag will be inflated to part of its full capacity.

In U.S. Pat. No. 5,667,246 (Scholz et al.), there are two accelerometers, each of which provides a signal when the value of the increase in deceleration exceeds a respective threshold value. The signal from the accelerometer is set to a first ignition stage and through a delay member to a second ignition stage. The second ignition stage also receives as input, a signal from the accelerometer and provides an inflation signal only when it receives a signal from both accelerometers. In operation, when the accelerometer sends a signal it serves to partially inflate the airbag while full inflation of the airbag is obtained only by input from both accelerometers Taniguchi (JP 4-293641) describes an apparatus for detecting a body moving around another body, such as to detect a car thief moving around a car. The apparatus includes a detection section supported on a support toll to the roof of the car. Taniguchi states that the detection section may be based on an infrared, microwave or ultrasonic sensor.

OBJECTS AND SUMMARY OF THE INVENTION

It is an object of the present invention to provide a new and improved apparatus and method for deploying multiple airbags in a vehicle wherein at least one airbag is provided to inflate and cause the occupant to be moved into a better position for subsequent deployment of another, protective airbag.

It is another object of the present invention to provide a new and improved apparatus and method for deploying airbags during a rollover in order to prevent injury to an occupant.

It is yet another object of the present invention to provide a new and improved apparatus and method for deploying airbags in particular during a rollover, but also for other types of crashes, in order to prevent an occupant from being positioned on the externally-facing side of a deploying side curtain airbag.

Additional objects and advantages of this invention and/or other inventions disclosed herein are:

1. To provide for the enhanced protection of occupants in side impacts by determining the probable severity of a pending accident and inflating an airbag prior to the impact to displace the occupant away from the vehicle door.
2. To provide for a method of identifying and classifying an object which is about to impact a vehicle.
3. To adapt pattern recognition techniques, and particularly neural networks (and modular neural networks), to permit the identification of objects external to an automotive vehicle and the determination of their approach speed and angle of potential collision.
4. To provide a method for assessing the probable severity of a pending accident based on the identification of the class of an object which is about to impact the vehicle plus stored information about the class of such objects such as its mass, strength and attachment to the earth.
5. To provide a method using an ultrasonic system for use in illuminating an object which is about to impact a vehicle and using the reflection of the ultrasonic illumination in combination with a pattern recognition system to identify the object.
6. To determine the approach velocity of an object which is about to impact a vehicle.
7. To identify that a truck is about to impact a vehicle.
8. To identify that an automobile is about to impact a vehicle.
9. To identify that a vehicle is about to impact with a tree.
10. To provide a method using an electromagnetic wave system for use in illuminating an object which is about to impact a vehicle and using the reflection of the electromagnetic wave illumination in combination with a pattern recognition system to identify the object.
11. To provide a method using the passive infrared electromagnetic waves radiating from an object such as a motor vehicle in combination with a pattern recognition system to identify the object.
12. To provide a system for identifying an object which is about to impact a vehicle in a substantially side impact.
13. To provide a system for identifying an object which is about to impact a vehicle in a substantially frontal impact and/or rear impact.
14. To provide a system comprising a variable inflation airbag system where the control of the inflation of the airbag is determined by a prediction of the probable severity of an accident prior to the accident occurring.
15. To provide apparatus for inducing slack into a seatbelt in the event of a side impact to permit the occupant to be displaced sideways in the vehicle.
16. To provide a single airbag module for protection of the head and torso of an occupant in side impacts.
17. To provide a single airbag module for mounting in the seat back of a vehicle for the protection of the head and torso of an occupant in side impacts.
18. To provide a structure and method for enabling movement of the occupant and his seat in the event of a side, front or rear impact accident to increase the space between the occupant and the intruding object.
19. To provide a method using radar or laser radiation that has been modulated with noise or a code for providing the information leading to identification of an object.
20. To provide for an airbag to be deployed external to the vehicle in conjunction with an anticipatory sensor in side, frontal or rear impacts.
21. To provide a method using an ultrasonic wave system for use in illuminating an object which is about to impact a vehicle and using the reflection of the ultrasonic wave illumination in combination with a pattern recognition system to identify the object.

22. To provide a new and improved system and method for inflating an airbag based on information obtained by an anticipatory sensor and one or more additional crash sensors which provide information about the crash after the crash has begun and adjust the pressure in the airbag, if necessary.

23. To provide a combined airbag inflation and occupant displacement enabling method and apparatus in which an occupant is permitted to be displaced in conjunction with the inflation of the airbag. In some cases, the occupant will be permitted to be displaced away from the airbag prior to impact.

24. To provide a method and system for enabling or permitting displacement of a vehicle occupant upon inflation of an airbag so that the occupant is permitted to be displaced away from a site of an impact of an object into the vehicle.

Accordingly, to achieve at least one of the above objects, an apparatus for deploying airbags in accordance with the invention comprises a first inflatable airbag for protecting an occupant in a seating location in the vehicle in a crash, a second inflatable airbag structured and arranged to move the occupant in the seating location away from an interior surface of the vehicle upon inflation, and a crash sensor system arranged to determine that a crash involving the vehicle will occur or is occurring and initiate inflation of the first and second airbags. The second airbag may be inflated prior to inflation of the first airbag such that inflation of the second airbag causes the occupant to be moved away from the interior surface of the vehicle and into a better position for deployment of the first airbag. In one exemplary embodiment, the first airbag is a side curtain airbag and the second airbag is arranged in a door of the vehicle to move the occupant away from the door of the vehicle.

If the crash sensor system comprises an anticipatory sensor, then the second airbag can even be inflated prior to a crash upon a determination by the anticipatory sensor that a crash involving the vehicle will occur based on data obtained prior to the crash.

An occupant position sensor system can be provided for determining the position of the occupant in the seating location, both before and after the deployment of the first, positioning airbag. The occupant position sensor system is coupled to the crash sensor system and the second airbag such that the second airbag is inflated only when the occupant is improperly positioned for deployment of the first airbag. At times though, for example for a rollover, inflation of both airbags would be desirable. A control unit is coupled to the crash sensor system and the occupant sensor system for initiating inflation of the first and second airbags based on output from the crash sensor system and the occupant position sensor system. An occupant sensor and/or a weight sensor can also be used to control the flow of gas into and/or out of the second airbag based of a determination of the force needed to move the occupant into position for the deployment of the curtain or tubular airbag. A larger or heavier person would require more force from the second airbag.

A method for deploying airbags in a vehicle comprises the steps of determining that a crash involving the vehicle will occur or is occurring, inflating a first airbag to move an occupant away from an interior surface of the vehicle if the occupant is against the interior surface, and then or more slowly inflating a second airbag to protect the occupant from injury in the crash. The same aspect mentioned above for the apparatus are applicable to the method as well.

Also, when the position of the occupant may be monitored after inflation of the first airbag, inflation of the second airbag may be suppressed if the occupant is still improperly positioned for deployment of the second airbag.

The timing between the inflation of the first and second airbags can be controlled based on the position of the occupant and/or a morphological property of the occupant as determined by sensors or input by the occupant.

A method for deploying a side curtain airbag in a vehicle to protect an occupant comprises the steps of detecting a crash or rollover condition requiring deployment of the side curtain airbag, determining the occupant's position, determining whether the occupant is out of position for deployment of the side curtain airbag, if so, deploying the side curtain airbag if the occupant is not out of position, and if not, deploying a positioning airbag to move the occupant into a proper position for deployment of the side curtain airbag and then or more slowly deploying the side curtain airbag. Determination of whether the occupant is out of position for deployment of the side curtain airbag may entail determining whether the occupant is too close to the side of the vehicle along which the side curtain airbag will deploy.

Optionally, a confirmation is made as whether the occupant is moving toward the proper position for deployment of the side curtain airbag after deployment of the positioning airbag, or is expected to move to a proper position. Thus, the position of the occupant may be monitored after inflation of the positioning airbag and inflation of the side curtain airbag suppressed if the occupant is still or is expected to be improperly positioned for deployment of the side curtain airbag.

Another apparatus for deploying airbags in a vehicle to protect occupants in the vehicle comprises a plurality of protective airbags for protecting an occupant in a crash, a plurality of positioning airbags each arranged to inflate to move an occupant in a desired direction into a deployment area of one of the protective airbags, a crash sensor system arranged to determine that a crash involving the vehicle will occur or is occurring, and a control unit coupled to the crash sensor system, the protective airbags and the positioning airbags and arranged to determine which protective airbag(s) and positioning airbag(s) should be deployed in the crash.

An occupant sensor system can be provided for determining the position of the occupant in which case, the control unit is coupled to the occupant sensor system and determines which protective airbag(s) and positioning airbag(s) should be deployed based on the determined position of the occupant.

Another vehicle including an apparatus for deploying multiple airbags comprises a side curtain airbag arranged to deploy along a side of the vehicle, a positioning airbag arranged to deploy inward from a door of the vehicle and a rollover sensor for determining that the vehicle is experiencing a rollover. The rollover sensor is coupled to the side curtain airbag and the positioning airbag and arranged to initiate inflation of the side curtain airbag and the positioning airbag when the vehicle experiences a rollover. The rollover sensor may be arranged to initiate inflation of the positioning airbag prior to or at the same time as inflation of the side curtain airbag. The rates of inflation of the positioning airbag and side curtain airbag may be varied.

Another apparatus for deploying airbags in a vehicle to protect occupants in the vehicle comprises a plurality of protective airbags for protecting an occupant in a crash, a plurality of positioning airbags arranged to inflate to move an occupant in a desired direction into a deployment area of one of the protective airbags, a crash sensor system arranged to determine that a crash involving the vehicle will occur or is occurring, an occupant sensor system for determining the position of occupants of the vehicle, and a control unit coupled to the occupant sensor system, the crash sensor system, the protective airbags and the positioning airbags and arranged to determine which of the positioning airbags should be deployed in the crash based on the position of the occupants in the vehicle.

In another embodiment in accordance with the invention, a vehicle including multiple airbags comprises a side curtain airbag arranged to deploy along a side of the vehicle, a positioning airbag arranged to deploy inward from a door of the vehicle, a crash sensor for determining that the vehicle is experiencing a crash or rollover, and a control unit coupled to the side curtain airbag, the positioning airbag and the crash sensor for determining whether deployment of the side curtain airbag is necessary for the crash. The control unit is arranged to initiate inflation of both the side curtain airbag and the positioning airbag when the control unit determines that deployment of the side curtain airbag is necessary. The control unit may be arranged to initiate inflation of the side curtain airbag at a slower rate that inflation of the positioning airbag and/or before inflation of the positioning airbag.

Preferred embodiments of the invention are described below and unless specifically noted, it is the applicant's intention that the words and phrases in the specification and claims be given the ordinary and accustomed meaning to those of ordinary skill in the applicable art(s). If the applicant intends any other meaning, he will specifically state he is applying a special meaning to a word or phrase.

Likewise, applicant's use of the word "function" here is not intended to indicate that the applicant seeks to invoke the special provisions of 35 U.S.C. §112, sixth paragraph, to define his invention. To the contrary, if applicant wishes to invoke the provisions of 35 U.S.C. §112, sixth paragraph, to define his invention, he will specifically set forth in the claims the phrases "means for" or "step for" and a function, without also reciting in that phrase any structure, material or act in support of the function. Moreover, even if applicant invokes the provisions of 35 U.S.C. §112, sixth paragraph, to define his invention, it is the applicant's intention that his inventions not be limited to the specific structure, material or acts that are described in the preferred embodiments herein. Rather, if applicant claims his inventions by specifically invoking the provisions of 35 U.S.C. §112, sixth paragraph, it is nonetheless his intention to cover and include any and all structure, materials or acts that perform the claimed function, along with any and all known or later developed equivalent structures, materials or acts for performing the claimed function.

Definitions

Throughout the description herein, the term "approaching" when used as an object or vehicle approaching another will generally mean the relative motion of the object toward the vehicle having the anticipatory sensor system. Thus, in a side impact with a tree, the tree will be considered as approaching the side of the vehicle and impacting the vehicle. In other words, the coordinate system used in general will be a coordinate system residing in the target vehicle. The "target" vehicle is the vehicle that is being impacted. This convention permits a general description to cover all of the cases such as where (i) a moving vehicle impacts into the side of a stationary vehicle, (ii) where both vehicles are moving when they impact, or (iii) where a vehicle is moving sideways into a stationary vehicle, tree or wall.

"Pattern recognition" as used herein will generally mean any system which processes a signal that is generated by an object, or is modified by interacting with an object, in order to determine which one of a set of classes that the object belongs to. Such a system might determine only that the object is or is not a member of one specified class, or it might attempt to assign the object to one of a larger set of specified classes, or find that it is not a member of any of the classes in the set. Each class can include a single object or a single type of objects. The signals processed are generally electrical signals coming from transducers which are sensitive to either acoustic or electromagnetic radiation and, if electromagnetic, they can be either visible light, infrared, ultraviolet, radar or low frequency radiation as used in capacitive sensing systems.

A trainable or a trained pattern recognition system as used herein generally means a pattern recognition system which is taught various patterns by subjecting the system to a variety of examples. The most successful such system is the neural network. Not all pattern recognition systems are trained systems and not all trained systems are neural networks. Other pattern recognition systems are based on fuzzy logic, sensor fusion, Kalman filters, correlation as well as linear and non-linear regression. Still other pattern recognition systems are hybrids of more than one system such as neural-fuzzy systems.

"To identify" as used herein will generally mean to determine that the object belongs to a particular set or class. The class may be one containing all trucks of a certain size or weight, one containing all trees, or all walls. In the case where a particular vehicle type is to be recognized, the set or class will contain only a single element, the particular vehicle type to be recognized.

BRIEF DESCRIPTION OF THE DRAWINGS

The present invention will be further understood from the following description with reference to the drawings in which:

FIG. 7A is an expanded view of the release mechanism within the circle designated 7A in FIG. 7;

FIG. 7B is a view of the apparatus of FIG. 7A within the circle designated 7B and rotated 90 degrees showing the release mechanism;

FIG. 8 is a front view of an occupant being restrained by a seatbelt integral with seat so that when seat moves during a crash with the occupant, the belt also moves allowing the occupant to be laterally displaced during the crash;

FIGS. 18A, 18B, 18C and 18D show the manner in which an occupant can be positioned improperly for deployment of a side curtain airbag during a rollover leading to severe injury;

FIGS. 19A, 19B, 19C and 19D show the manner in which an occupant is re-positioned for deployment of a side curtain airbag during a rollover thereby preventing severe injury;

FIG. 20 is a flow chart showing the manner in positioning airbags are used in accordance with the invention.

DETAILED DESCRIPTION OF THE INVENTION

Figure 1:
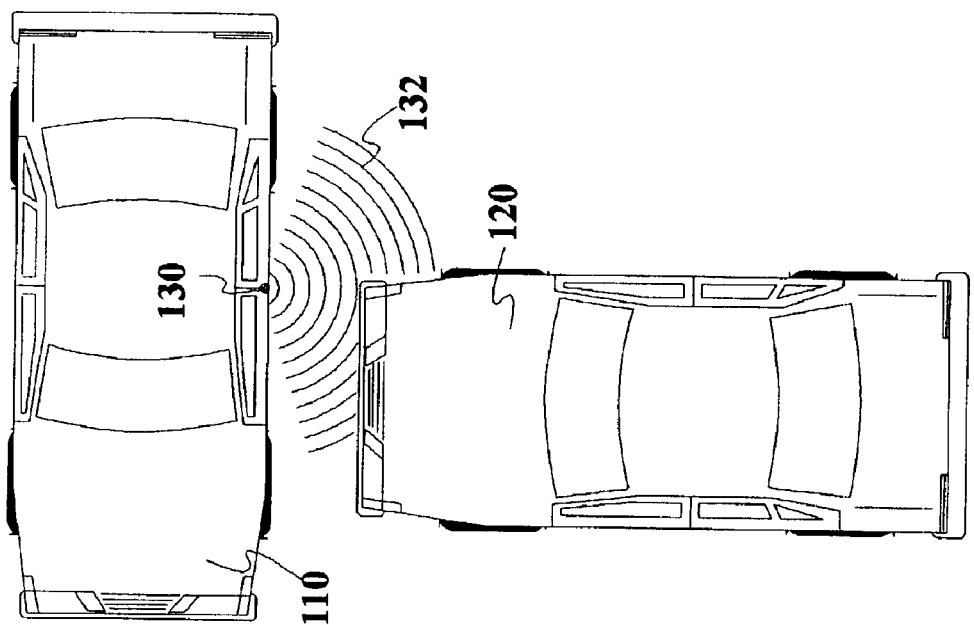
FIG. 1 is an overhead view of a vehicle about to be impacted in the side by an approaching vehicle showing a wave transmitter part of the anticipatory sensor system.
Figure 1A:
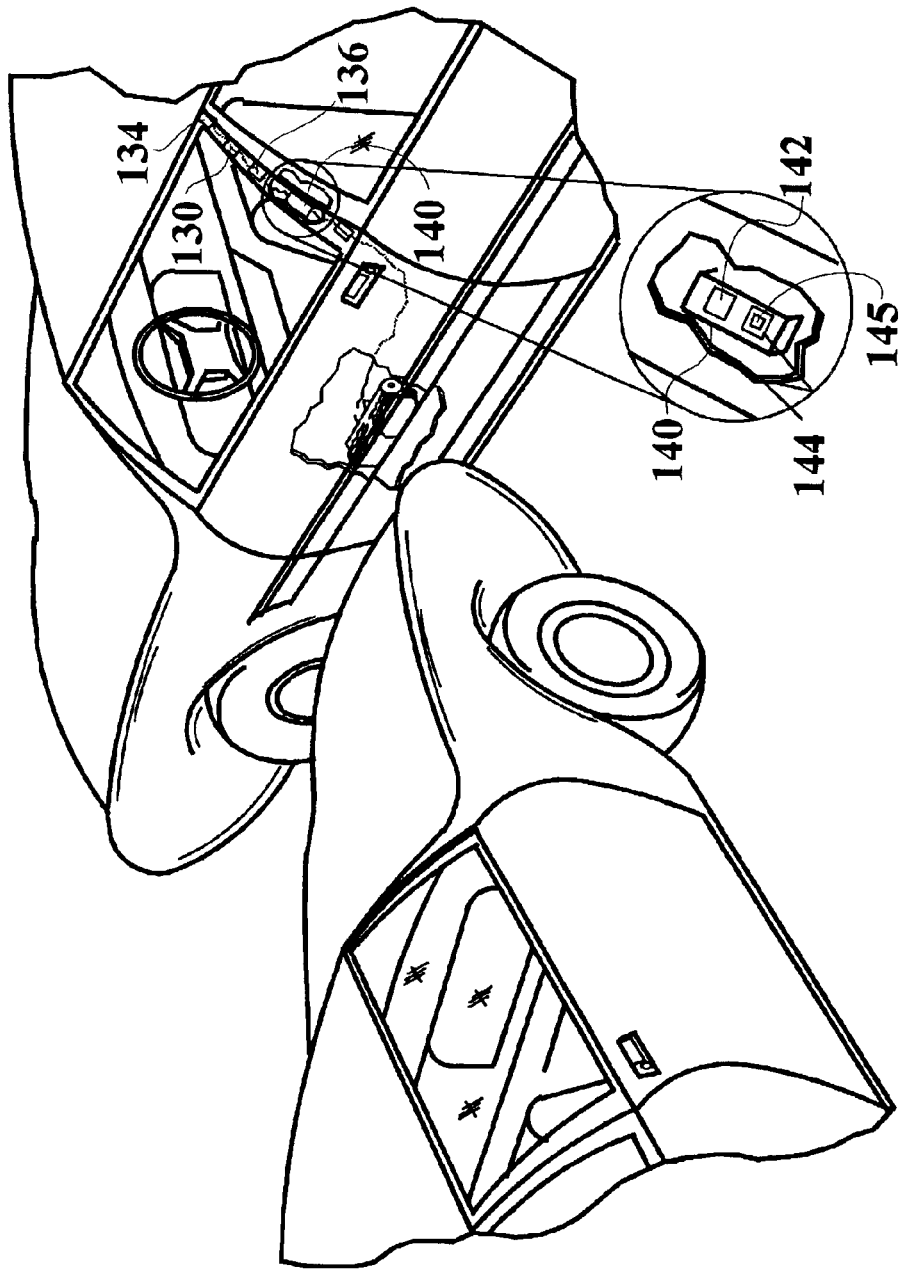
FIG. 1A is a perspective view of a vehicle about to impact the side of another vehicle showing the location of the various parts of an anticipatory sensor system of this invention.

Referring to the accompanying drawings wherein like reference numerals refer to the same or similar elements, FIG. 1 is an overhead view of a vehicle 110 about to be impacted in the side by an approaching vehicle 120 where vehicle 110 is equipped with an anticipatory sensor system in accordance with the invention including a wave transmitter 130 which transmits waves 132 toward the approaching vehicle 120. A perspective view of vehicle 110 is shown in FIG. 1A and illustrates the transmitter 130 connected to an electronic module 140 (this connection being symbolized by the dotted lines between the transmitter 130 and the module 140 which may represent a wire). Module 140 is mounted in the B-pillar and contains circuitry means 142 to drive the transmitter 130 to transmit waves and circuitry means 144 coupled to wave receivers 134,136, which receive the returned waves and convert the same into signals, to process the signals from receivers 134 and 136 representative of the returned waves. Circuitry 144 preferably contains a neural computer or computer with resident pattern recognition algorithm 145 that performs the pattern recognition determination based on signals from the receivers 134 and 136. Receivers 134,136 are positioned are either side of transmitter 130, although the presence of two such receivers and the positioning on both sides of the transmitter 130 is not critical or essential to the invention and different amounts of receivers and different relative positions of receivers to the transmitter are encompassed within the scope and spirit of invention.

In a preferred implementation, transmitter 130 is an ultrasonic transmitter operating at a frequency of approximately 40 kHz, although other frequencies could be used. Similarly, receivers 134 and 136 are ultrasonic receivers or transducers and receive the reflected ultrasonic waves from vehicle 120.

A detailed discussion of pattern recognition technology as applied to the monitoring and identification of occupants and objects within a vehicle is discussed in detail in Breed et al. (U.S. Pat. No. 5,829,782) incorporated herein by reference. Although the application herein is for the identification of objects exterior to the vehicle, many of the same technologies, principles and techniques are applicable.

An example of such a pattern recognition system using neural networks using sonar is discussed in two papers by Gorman, R,. P. and Sejnowski, T. J. "Analysis of Hidden Units in a Layered Network Trained to Classify Sonar Targets", *Neural Networks*, Vol. 1. pp 75–89, 1988, and "Learned Classification of Sonar Targets Using a Massively Parallel Network", IEEE Transactions on Acoustics, Speech, and Signal Processing, Vol.36, No. 7, July 1988.

A "trained" pattern recognition system as used herein will mean a pattern recognition system that is trained on data representing different operating possibilities. For example, the training data may constitute a number of sets of a signal from receiver 134 represented the returned waves received thereby, a signal from receiver 136 representing the returned waves received thereby and one or more properties of the approaching object, e.g., its form or shape, size or weight, identity, velocity, breadth and relative distance. Once trained, the trained pattern recognition system will be provided with the signals from receivers 134,136 and categorize the signals that would lead to a determination by the system of the property or properties of the approaching object, e.g., its size or identity.

Some examples follow:

In a passive infrared system, a detector receives infrared radiation from an object in its field of view, in this case the approaching object is most likely another vehicle, and processes the received infrared radiation radiating from the vehicle's engine compartment. The anticipatory sensor system then processes the received radiation pattern to determine the class of vehicle, and, along with velocity information from another source, makes an assessment of the probable severity of the pending accident and determines if deployment of an airbag is required. This technology can provide input data to a pattern recognition system but it has limitations related to temperature. The sensing of a non-vehicle object such as a tree, for example, poses a particular problem. The technology may also fail to detect a vehicle that has just been started especially if the ambient temperature is high. Nevertheless, for use in the identification of approaching vehicles the technology can provide important information especially if it is used to confirm the results from another sensor system.

In a laser optical system, the transmitter 130 comprises an infrared laser beam which is used to momentarily illuminate an object as illustrated in FIG. 1 where transmitter 130 is such a laser beam transmitter. In some cases, a charge coupled device (a type of TV camera), or a CMOS optical sensor array, is used to receive the reflected light and would be used as one or both of the receivers 132 and 134. The laser can either be used in a scanning mode, or, through the use of a lens, a cone of light can be created which covers a large portion of the object. In each case, a pattern recognition system, as defined above, is used to identify and classify the illuminated object and its constituent parts. The scanning implementation of the laser system has an advantage that the displacement of the object can be calculated by triangulation of the direction of the return light from the transmitted light providing the sensor and transmitter as displaced from one another. This system provides the most information about the object and at a rapid data rate. Its main drawback is cost which is considerably above that of ultrasonic or passive infrared systems and the attenuation that results in bad weather conditions such as heavy rain, fog or snow storms. As the cost of lasers comes down in the future, this system will become more competitive. The attenuation problem is not as severe as might be expected since the primary distance of concern for anticipatory sensors as described here is usually less than three meters and it is unlikely that a vehicle will be operated with a visibility of only a few meters. If the laser operates in the infrared region of the spectrum, the attenuation from fog is less than if it is operated in the visible part of the spectrum.

Radar systems have similar properties to the laser system discussed above with the advantage that there is less attenuation in bad weather. The wavelength of a particular radar system can limit the ability of the pattern recognition system to detect object features smaller than a certain size. This can have an effect in the ability of the system to identify different objects and particularly to differentiate between different truck and automobile models. It is also more difficult to use radar in a triangulation system to obtain a surface map of the illuminated object as can be done with an infrared laser.

The ultrasonic system is the least expensive and potentially provides less information than the laser or radar systems due to the delays resulting from the speed of sound and due to the wave length which is considerably longer than the laser systems. The wavelength limits the detail that can be seen by the system. In spite of these limitations, as shown in the above referenced Breed et al. patent (U.S. Pat. No. 5,829,782), ultrasonics can provide sufficient timely information to permit the position and velocity of an approaching object to be accurately known and, when used with an appropriate pattern recognition system, it is capable of positively determining the class of the approaching object. One such pattern recognition system uses neural networks and is similar to that described in the papers by Gorman et al. and in the rear facing child seat recognition system referenced and described in the Breed et al. patent referenced above.

A focusing system, such as used on some camera systems, could be used to determine the position of an approaching vehicle when it is at a significant distance away but is too slow to monitor this position just prior to a crash. This is a result of the mechanical motions required to operate the lens focusing system. By itself, it cannot determine the class of the approaching object but when used with a charge coupled, or CMOS, device plus infrared illumination for night vision, and an appropriate pattern recognition system, this becomes possible.

From the above discussion, it can be seen that the addition of sophisticated pattern recognition means to any of the standard illumination and/or reception technologies for use in a motor vehicle permits the development of an anticipatory sensor system which can identify and classify an object prior to the actual impact with the vehicle.

Figure 2:
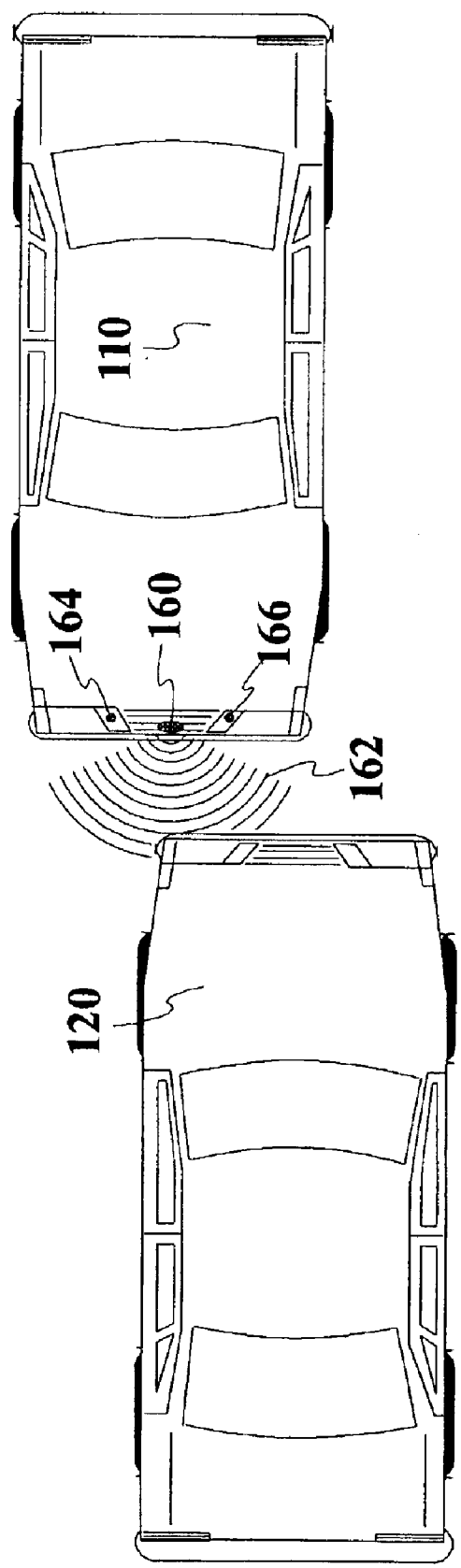
FIG. 2 is an overhead view of a vehicle about to be impacted in the front by an approaching vehicle showing a wave transmitter part of the anticipatory sensor system.

The application of anticipatory sensors to frontal impact protection systems is shown in FIG. 2 which is an overhead view of a vehicle 110 about to be impacted in the front by an approaching vehicle 120. In a similar manner as in FIG. 1, a transmitter 160 transmits waves 162 toward vehicle 120. These waves are reflected off of vehicle 120 and received by receiving transducers 164 and 166 positioned on either side of transmitter 160.

Figure 3A:
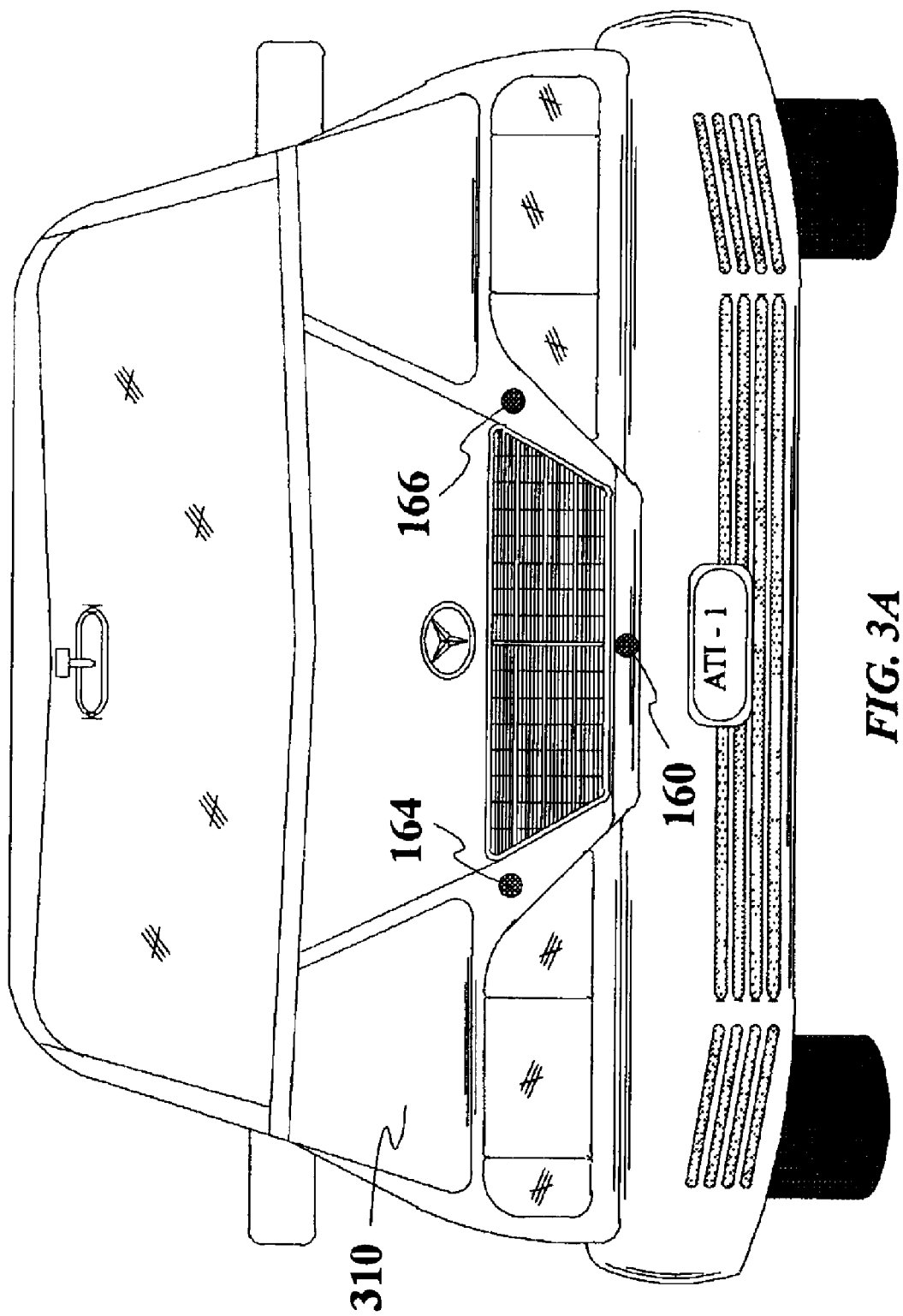
FIG. 3A a plan front view of the front of a car showing the headlights, radiator grill, bumper, fenders, windshield, roof and hood.
Figure 3B:
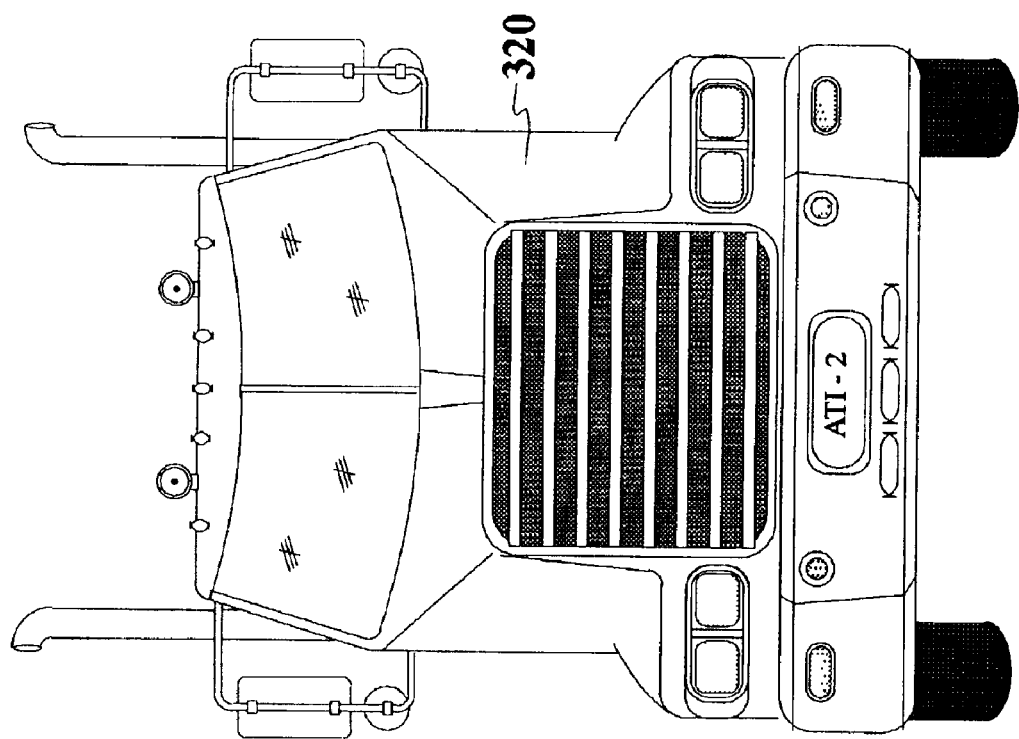
FIG. 3B a plan front view of the front of a truck showing the headlights, radiator grill, bumper, fenders, windshield, roof and hood.

FIG. 3A illustrates the front of an automobile 310 and shows preferred locations for transmitting transducer 160 and receiving transducers 164 and 166, i.e., the transmitter 160 below the grill and the receivers 164,166 on each side of the grill. FIG. 3A also illustrates the distinctive features of the vehicle which cause a distinct pattern of reflected waves which will differ from that of a truck 320, for example, as shown in FIG. 3B. In some pattern recognition technologies, the researcher must determine the distinctive features of each object to be recognized and form rules that permit the system to recognize one object from another of a different class. An alternative method is to use artificial neural network technology wherein the identification system is trained to recognize different classes of objects. In this case, a training session is conducted where the network is presented with a variety of objects and told to which class each object belongs. The network then learns from the training session and, providing a sufficient number and diversity of training examples are available, the network is able to categorize other objects which have some differences from those making up the training set of objects. The system is quite robust in that it can still recognize objects as belonging to a particular class even when there are significant differences between the object to be recognized and the objects on which the system was trained.

Once a neural network has been sufficiently trained, it is possible to analyze the network and determine the "rules"

which the network evolved. These rules can then sometimes be simplified or generalized and programmed as a fuzzy logic algorithm. Alternately, a neural computer can be programmed and the system implemented on a semiconductor chip as available from Motorola.

The anticipatory sensor system must also be able to determine the distance, approach velocity and trajectory of the impacting object in addition to the class of objects to which it belongs. This is easily done with acoustic systems since the time required for the acoustic waves to travel to the object and back determine its distance based on the speed of sound. With radar and laser systems, the waves usually need to be modulated and the phase change of the modulation determined in order to determine the distance to the object as discussed in more detail in U.S. Pat. No. 5,653,462 (Breed et al.), incorporated herein by reference in its entirety. Since the same distance measurement techniques are used here as in the two above referenced patent applications, they will not be repeated here.

There is a radar chip on the market that permits the distance determination based on the time required for the radar waves to travel to the object and back. This technology was developed by Amerigon Inc. of Burbank, Calif. and is being considered for other automotive applications such as constant distance cruise control systems and backing-up warning systems.

FIG. 3A is a plan front view of the front of a car showing the headlights, radiator grill, bumper, fenders, windshield, roof and hood and other objects which reflect a particular pattern of waves whether acoustic or electromagnetic. Similarly, FIG. 3B is a plane frontal view of the front of a truck showing the headlights, radiator grill, bumper, fenders, windshield, roof and hood illustrating a significantly different pattern. Neural network pattern recognition techniques using software available from NeuralWare Corp. of Pittsburgh, Pa. can be used to positively classify trucks as a different class of objects from automobiles and further to classify different types of trucks giving the ability to predict accident severity based on truck type and therefore likely mass, as well as velocity. Other software tools are also commercially available for creating neural networks and fuzzy logic systems capable of recognizing patterns of this type.

Figure 4:
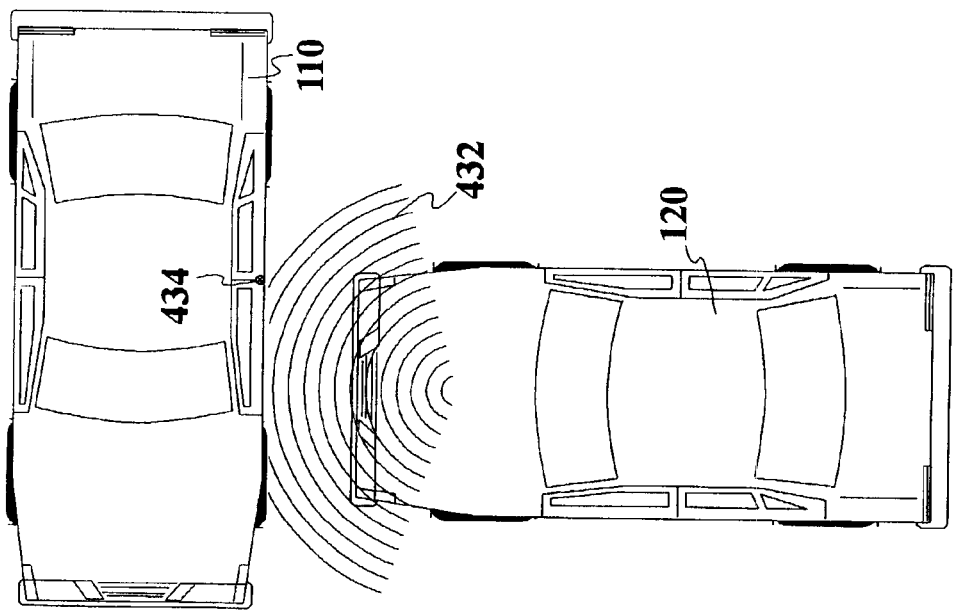
FIG. 4 is an overhead view of a vehicle about to be impacted in the side by an approaching vehicle showing an infrared radiation emanating from the front of the striking vehicle and an infrared receiver part of the anticipatory sensor system.

In FIG. 4, an overhead view of a vehicle 110 about to be impacted in the side by an approaching vehicle 120 in a perpendicular direction is illustrated where infrared radiation 432 is radiating from the front of the striking vehicle 120. An infrared receiver 434 arranged on the side of vehicle 110 receives this radiation for processing as described above.

Figure 5:
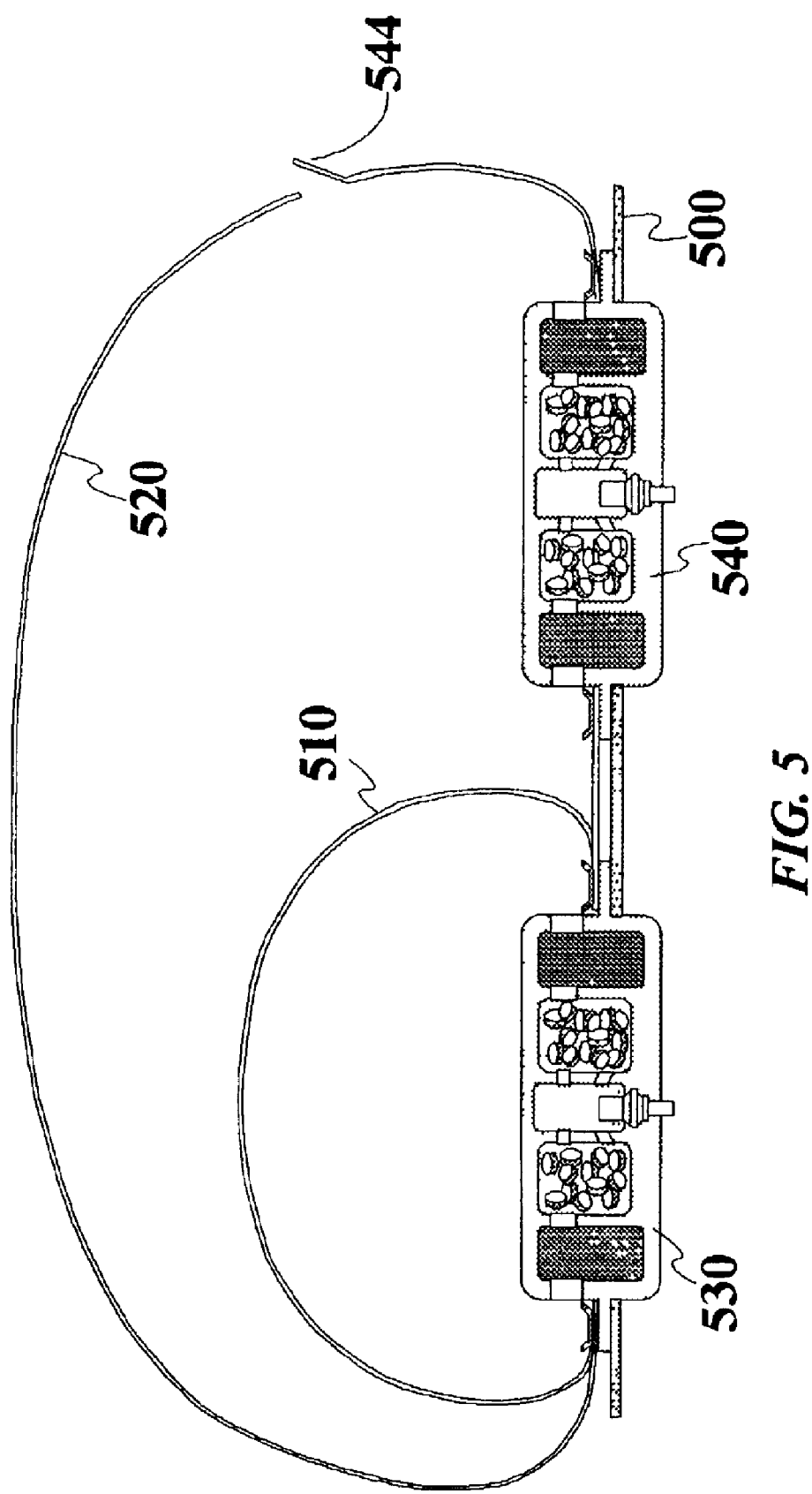
FIG. 5 is a side view with portions cutaway and removed of a dual inflator airbag system with two airbags with one airbag lying inside the other.

The anticipatory sensor system described and illustrated herein is mainly used when the pending accident will cause death or serious injury to the occupant. Since the driver will no longer be able to steer or apply the brakes to the vehicle after deployment of an airbag which is sufficiently large to protect him in serious accidents, it is important that this large airbag not be deployed in less serious accidents where the driver's injuries are not severe. Nevertheless, it is still desirable in many cases to provide some airbag protection to the driver. This can be accomplished as shown in FIG. 5 which is a side view with portions cutaway and removed of a dual inflator airbag system, shown generally as 500, with an airbag 505 which in essence comprises two separate airbags 510 and 520 with one airbag 510 lying inside the other airbag 520. An optional variable outflow port or vent 544 is provided in connection with airbag 520 in a manner known in the art. Although a single inflator having a variable inflation rate capability can be used, FIG. 5 illustrates the system using two discrete inflators 530 and 540 which may be triggered independently or together to thereby provide a variable inflation rate of the airbag 505. Inflator 540 and associated airbag 520 are controlled by the anticipatory sensor system described herein and the inflator 530 and associated airbag 510 could also be initiated by the same system. In a less severe accident, inflator 530 can be initiated also by the anticipatory sensor without initiating inflator 540 or, alternately, inflator 530 could be initiated by another sensor system such as described U.S. Pat. No. 5,231,253 to Breed et al., incorporated herein by reference in its entirety. Each inflator 530,540 contains standard materials therefor, e.g., an initiator, a gas propellant.

Figure 12:
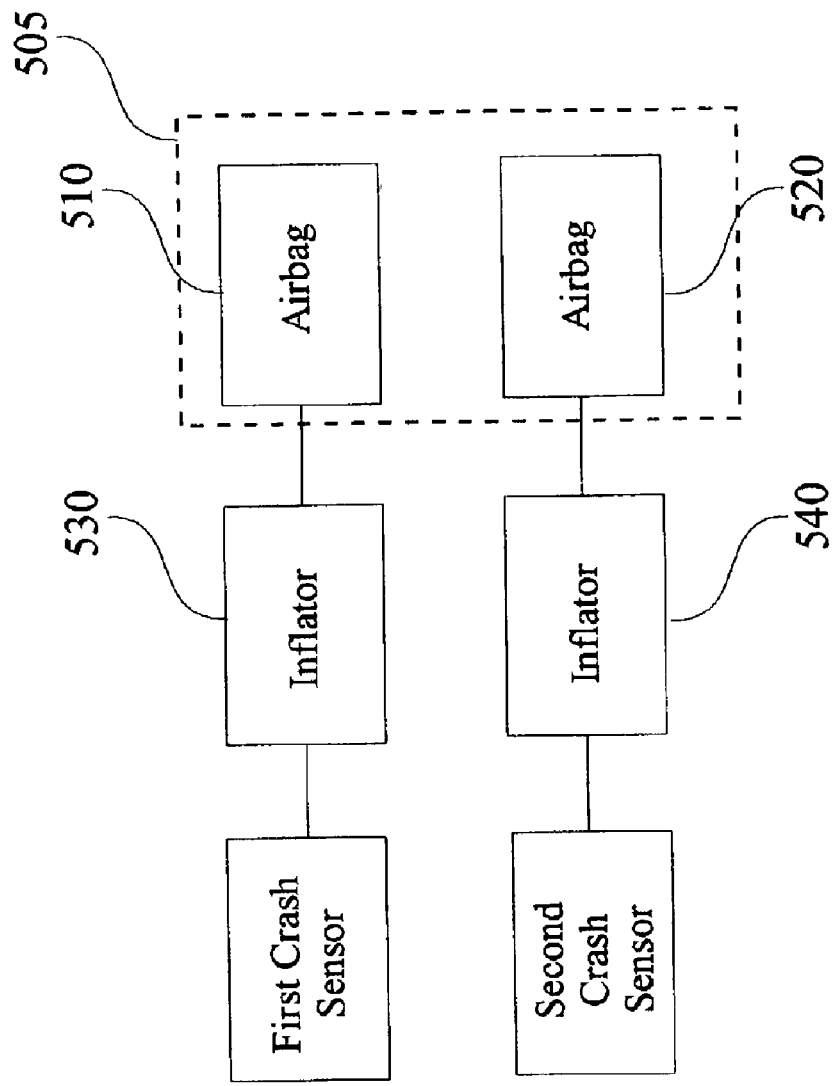
FIG. 12 is a schematic drawing of a variable inflation inflator system in accordance with the invention using two inflators.

Thus, the variable inflation rate inflator system for inflating the airbag 505 comprises inflators 530,540 for producing a gas and directing the gas into the airbag 505, and crash sensors (as described in any of the embodiments herein or otherwise available) for determining that a crash requiring an airbag will occur or is occurring and, upon the making of such a determination, triggering the inflator(s) 530 and/or 540 to produce gas and direct the gas into the airbag 505 to thereby inflate the same at a variable inflation rate, which depends on whether only inflator 530 is triggered, only inflator 540 is triggered or both inflators 530,540 are triggered (see FIG. 12).

More particularly, the inflator 540 may be associated with an anticipatory crash sensor to be triggered thereby and the inflator 530 may be associated with the anticipatory crash sensor or another different sensor, such as one which detects the crash only after it has occurred. In this manner, inflator 540 will be triggered prior to inflator 530 and inflator 530, if triggered, will supply an additional amount of gas into the airbag 505.

Figure 13:
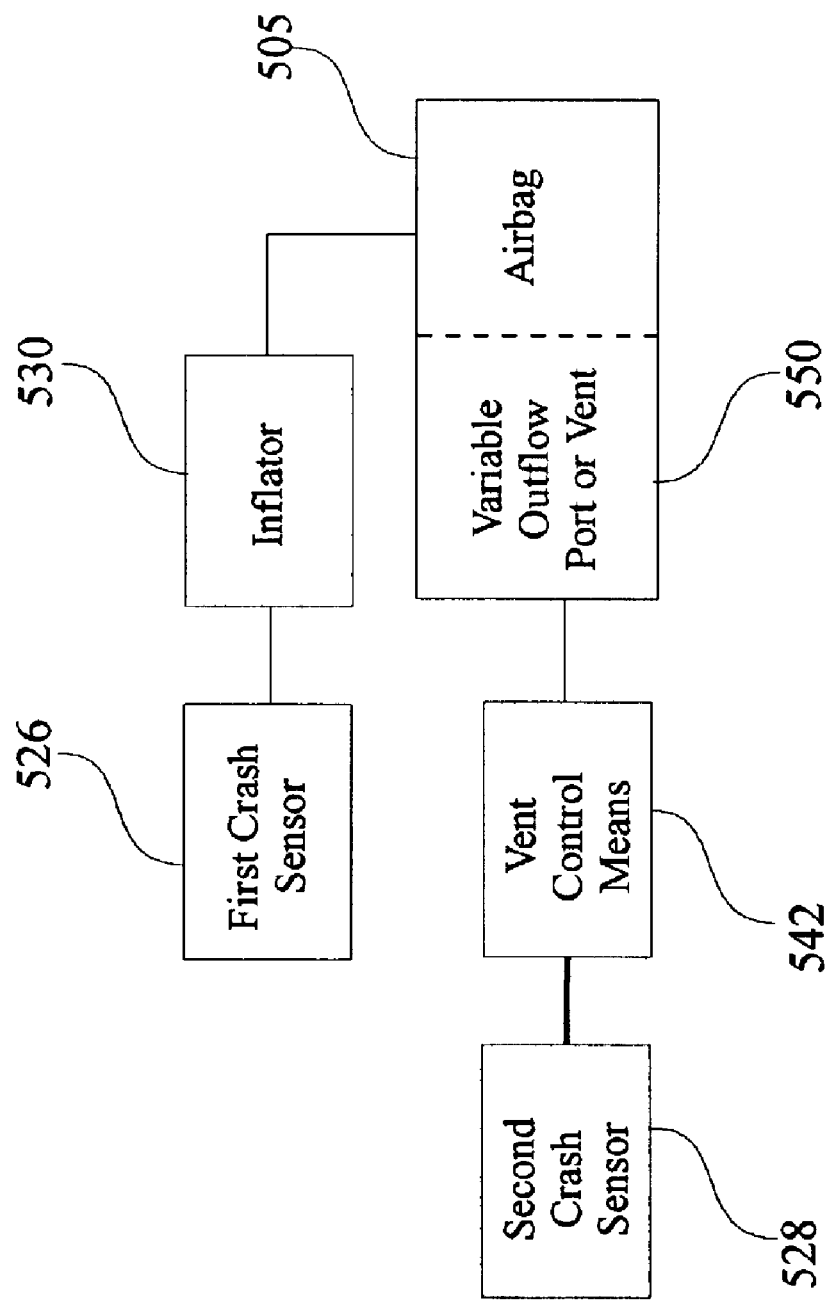
FIG. 13 is a schematic drawing of a variable inflation inflator system in accordance with the invention using a single inflator and a variable outflow port or vent.

Although the description above is based on the use of two inflators, the same result can be obtained through the use of a variable outflow port or vent 550 from the airbag 505 (additional information about a variable outflow port or vent from the airbag 505 is provided in the current assignee's U.S. Pat. No. 5,748,473 (FIG. 9) incorporated by reference in its entirety herein). A schematic drawing of an embodiment including a single inflator and a variable outflow port or vent from the airbag is shown in FIG. 13. This has the advantage that only a single inflator is required and the decision as to how much gas to leave in the airbag can be postponed.

As shown in FIG. 13, a first crash sensor 526 is an anticipatory sensor and determines that a crash requiring deployment of the airbag 505 is about to occur and initiates deployment prior to the crash of substantially concurrent with the crash. Thereafter, a second crash sensor 528, which may be an anticipatory crash sensor (possibly even the same as crash sensor 526) or a different type of crash sensor, e.g., a crush sensor or acceleration based crash sensor, provides information about the crash before it occurs or during its occurrence and controls vent control means 542 to adjust the pressure in the airbag. The vent control means 542 may be a valve and control system therefor which is situated or associated with a conduit connected to the outflow port or vent 544 at one end and at an opposite end to any location where the pressure is lowered than in the airbag whereby opening of the valve causes flow of gas from the airbag through the conduit and valve.

Specifically, the vent control means 542 adjust the flow of gas through the port or vent 544 in the airbag 505 (FIG. 5)

to enable removal of a controlled amount of gas from the airbag 505 and/or enable a controlled flow of gas from the airbag 505. In this manner, the airbag 505 can be inflated with the maximum pressure prior to or substantially concurrent with the crash and thereafter, once the actual crash occurs and additional, possibly better, information is known about the severity of the crash, the pressure in the airbag is lowered to be optimal for the particular crash (and optimally in consideration of the position of the occupant at that moment).

In the alternative, the vent control means 542 can be controlled to enable removal of gas from the airbag 505 concurrent with the generation of gas by the inflator 540 (and optionally 530). In this manner, the rate at which gas accumulates in the airbag 505 is controllable since gas is being generated by inflator 540 (and optionally inflator 530, dependent on the anticipated severity of the crash) and removed in a controlled manner via the outflow port or vent 544.

Referring again to FIG. 5, when the large airbag 520 is inflated from the driver's door, for example, it will attempt to displace the occupant away from the vehicle door. If the seatbelt attachment points do not also move, the occupant will be prevented from moving by the seatbelt and some method is required to introduce slack into the seatbelt or otherwise permit him to move. Such a system is shown in FIG. 6 which is a perspective view of a seatbelt mechanism where a device releases a controlled amount of slack into seatbelt allowing an occupant to be displaced.

Figure 6:
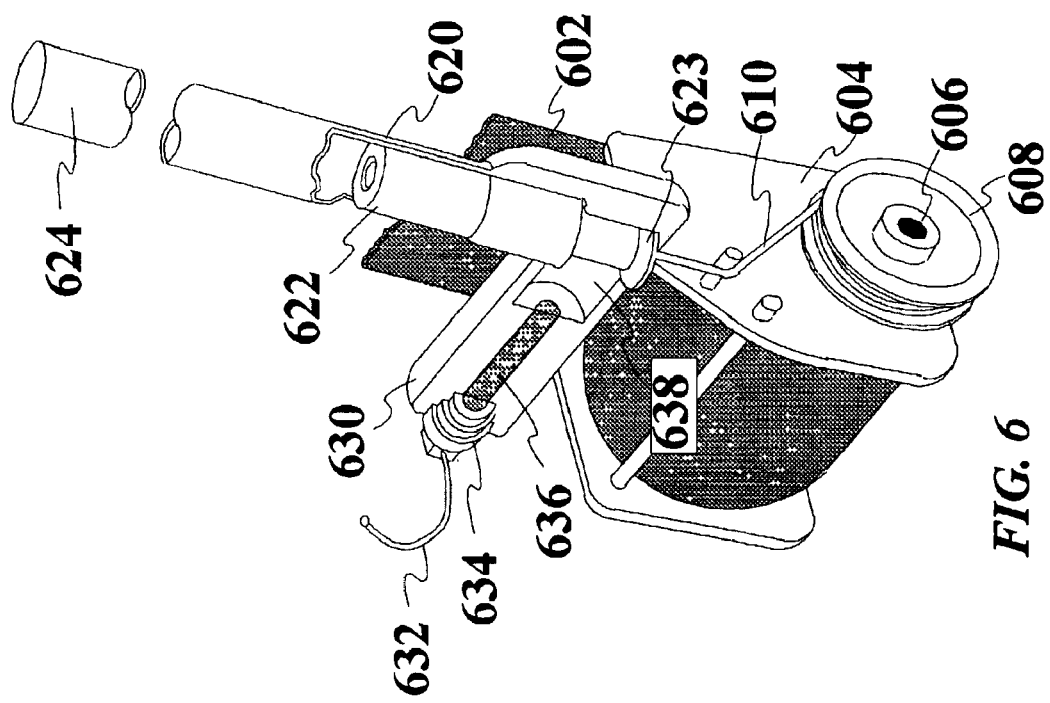
FIG. 6 is a perspective view of a seatbelt mechanism illustrating a device to release a controlled amount of slack into seatbelt allowing an occupant to be displaced.

The seatbelt spool mechanism incorporating the slack inducer is shown generally as 600 in FIG. 6 and includes a seatbelt 602 only a portion of which is shown, a housing 604 for the spool mechanism, a spool 606 containing several wound layers of seatbelt material 602. Also attached to the spool 606 is a sheave 608 upon which is wound a cable 610. Cable 610 is connected to a piston 622 of an actuator 620. Piston 622 is positioned within a cylinder 624 of the actuator 620 so that a space is defined between a bottom of the cylinder 624 and the piston 622 and is able to move within cylinder 624 as described below.

When the anticipatory sensor system decides to deploy the airbag, it also sends a signal to the seatbelt slack inducer system of FIG. 6. This signal is in the form of an electric current which passes through a wire 632 and is of sufficient magnitude to initiate pressure generating means for generating a pressure in the space between the piston 622 and the cylinder 624 to force the piston 622 in a direction to cause the sheave 608 to rotate and thus the spool 606 to rotate and unwind the seatbelt therefrom. More specifically, the electric current through wire 632 ignites a squib 634 arranged in connection with a propellant housing 630. Squib 634 in turn ignites propellant 636 situated within housing 630. Propellant 636 burns and produces gas which pressurizes chamber 638 defined in housing 630, which is in fluid communication with the space at a bottom 623 of the cylinder 624 between the cylinder 624 and the piston 622, and pressurizes cylinder 624 below piston 622. When subjected to this pressure, piston 622 is propelled upward within cylinder 624, pulling cable 610 and causing sheave 608 to rotate in the counterclockwise direction as shown in FIG. 6. This rotation causes the spool 606 to also rotate causing the belt 602 to spool off of spool 606 and thereby inducing a controlled amount of slack into the belt and thus permitting the occupant to be displaced to the side.

In some cases, it may not be necessary to control the amount of slack introduced into the seatbelt and a simpler mechanism which releases the seatbelt can be used.

Figure 7:
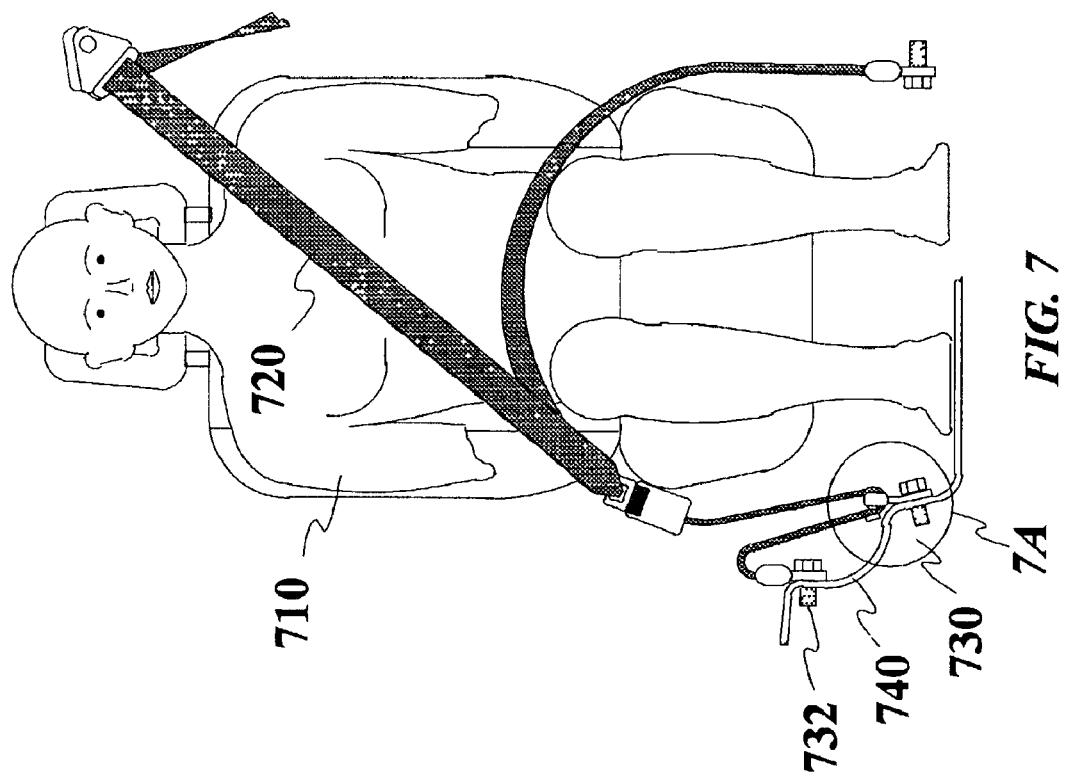
FIG. 7 is a front view of an occupant being restrained by a seatbelt having two anchorage points on the driver's right side where the one is released allowing the occupant to be laterally displaced during the crash.

An alternate system is shown in FIG. 7 which is a frontal view of an occupant 710 being restrained by a seatbelt 720 having two anchorage points 730 and 732 on the right side of the driver where the one 730 holding the belt at a point closest to the occupant 710 is released allowing the occupant 710 to be laterally displaced to the left in the figure during the crash. A detail of the release mechanism 730 taken within the circle 7A is shown in FIG. 7A.

The mechanism shown generally as 730 comprises an attachment bolt 744 for attaching the mechanism to the vehicle tunnel sheet-metal 740. Bolt 744 also retains a metal strip 742 connected to member 737. Member 737 is in turn attached to member 739 by means of explosive bolt assembly 736. Member 739 retains the seatbelt 720 by virtue of pin 738 (FIG. 7B). A stop 752 placed on belt 720 prevents the belt from passing through the space between pin 738 and member 739 in the event that the primary anchorage point 732 fails. Upon sensing a side impact crash, a signal is sent through a wire 734 which ignites explosive bolt 736 releasing member 737 from 739 and thereby inducing a controlled amount of slack into the seatbelt.

In some implementations, the vehicle seat is so designed that in a side impact, it can be displaced or rotated so that both the seat and occupant are moved away from the door. In this case, if the seatbelt is attached to the seat, there is no need to induce slack into the belt as shown in FIG. 8. FIG. 8 is a frontal view of an occupant 810 being restrained by a seatbelt 820 integral with seat 830 so that when seat 830 moves during a crash with the occupant 810, the seatbelt 820 and associated attachments 842, 844, 846 and 848 also move with the seat allowing the occupant 810 to be laterally displaced during the crash.

Figure 9A:
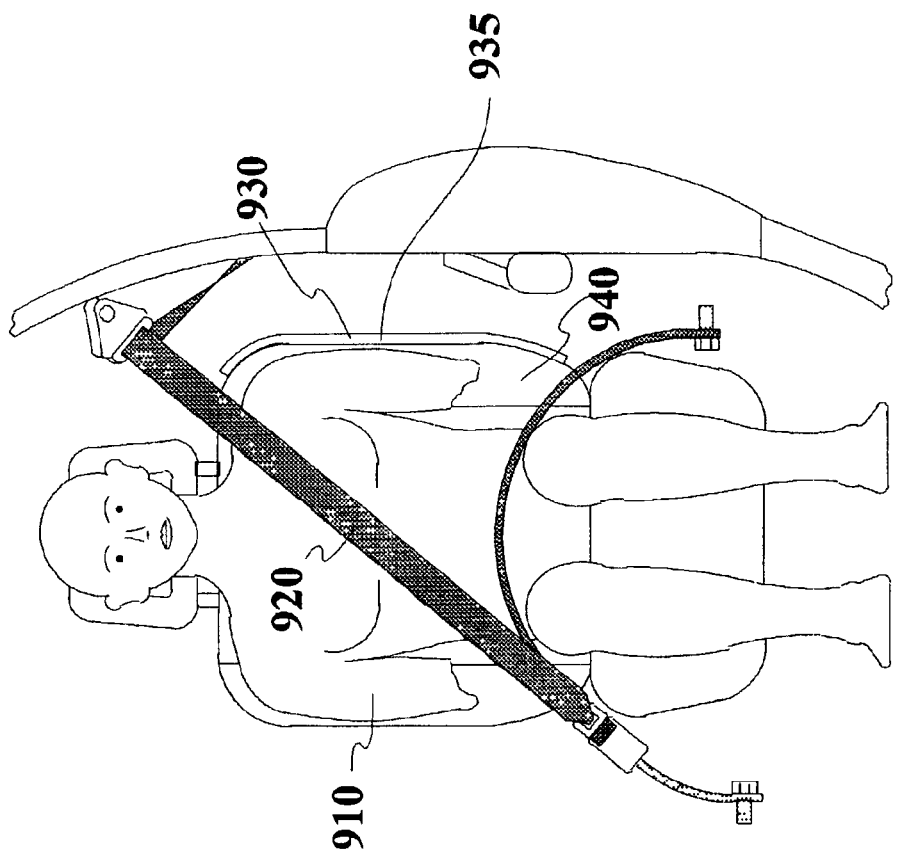
FIG. 9A is a front view of an occupant being restrained by a seatbelt and a linear airbag module attached to the seat back to protect entire occupant from his pelvis to his head.

Various airbag systems have been proposed for protecting occupants in side impacts. Some of these systems are mounted within the vehicle seat and consist of a plurality of airbag modules when both the head and torso need to be protected. An illustration of the use of this module is shown in FIG. 9A, which is a frontal view of an occupant 910 being restrained by a seatbelt 920 and a linear airbag module 930, of the type described in the aforementioned patent application, including among other things a housing 935 and an inflatable airbag 932 arranged therein and associated inflator means. This linear module is mounted by appropriate mounting means to the side of seat back 940 to protect the entire occupant 910 from his pelvis to his head. An anticipatory sensor may be provided as described above, i.e., one which detects that a side impact requiring deployment of the airbag is required based on data obtained prior to the crash and initiates inflation of the airbag by the inflator means in the event a side impact requiring deployment of the airbag is detected prior to the start of the impact.

Airbag module 930 may extend substantially along a vertical length of the seat back 940 as shown, and the airbag 932 in the housing 935 may be attached to the seat-back 940 or integral therewith.

Figure 9B:
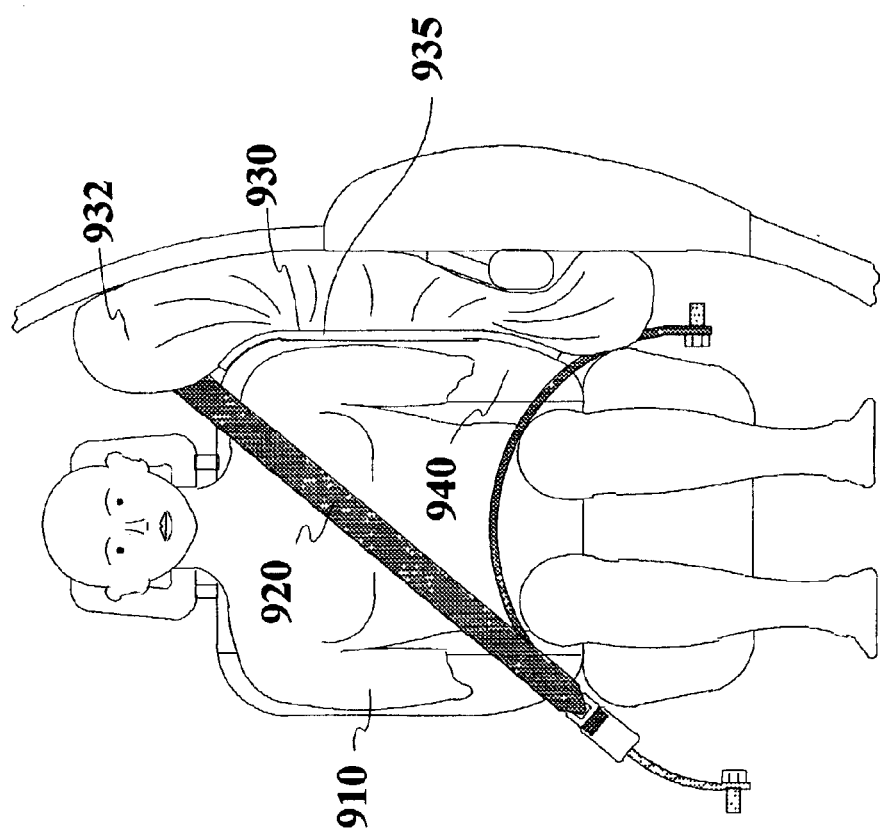
FIG. 9B is a view of the system of FIG. 9A showing the airbag in the inflated condition.

A view of the system of FIG. 9A showing the airbag 932 in the inflated condition is shown in FIG. 9B.

Figure 10A:
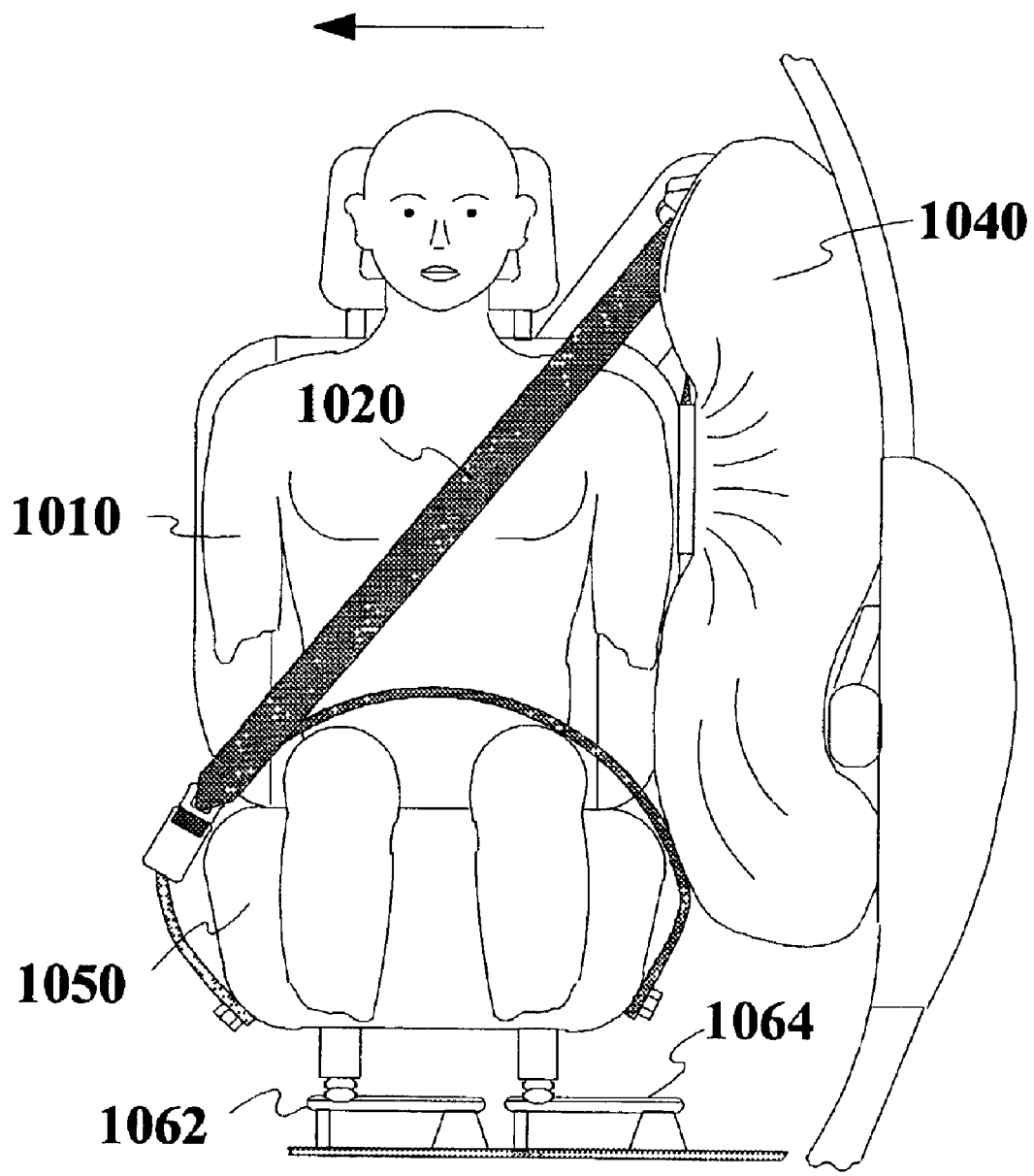
FIG. 10A is a front view of an occupant being restrained by a seatbelt and where the seat is displaced toward vehicle center by the deploying airbag in conjunction with other apparatus.

In FIG. 10A, a frontal view of an occupant 1010 being restrained by a seatbelt 1020 and wherein the seat 1050 is displaced toward vehicle center, i.e., away from the side and side door of the vehicle, by deploying airbag 1040 is shown. In this case, the seatbelt 1020 is attached to the seat 1050 as described above with reference to FIG. 8. In this case, rail mechanisms 1062 and 1064 permit the seat to be displaced away from the door under the force produced by the deploying airbag 1040. Rail mechanisms 1062,1064 may include a first member having a guide channel and a second member having a projection positioned for movement in the guide channel of the first member.

To enable displacement of the seat 1050 and thus the occupant 1010 away from the airbag-deploying structure, the door in the illustrated embodiment, by the force exerted on the seat 1050 upon inflation of the airbag 1040, the rail mechanisms 1062,1064 are preferably oriented in any direction not perpendicular to the deploying direction of the airbag, i.e., not parallel to the side of the vehicle in the illustrated example. Otherwise, if the orientation of the rails mechanisms 1062,1064 was parallel to the side of the vehicle and the airbag 1040 deployed in a direction perpendicular to the side of the vehicle, the seat 1050 would not be moved away from the side door. Obviously, to provide for the fastest possible displacement away from the airbag-deploying structure, the rail mechanisms 1062,1064 are oriented perpendicular to the airbag-deploying structure, which may also be parallel to the deploying direction of the airbag 1040.

Thus, for an airbag mounted in the steering wheel or dashboard and designed to deploy in a frontal impact, the rail mechanisms 1062,1064 would optimally be oriented in the longitudinal direction of the vehicle. For an airbag mounted in the side as shown in FIG. 10A, the rail mechanisms would optimally be oriented in a direction perpendicular to the longitudinal direction of the vehicle.

Figure 10B:
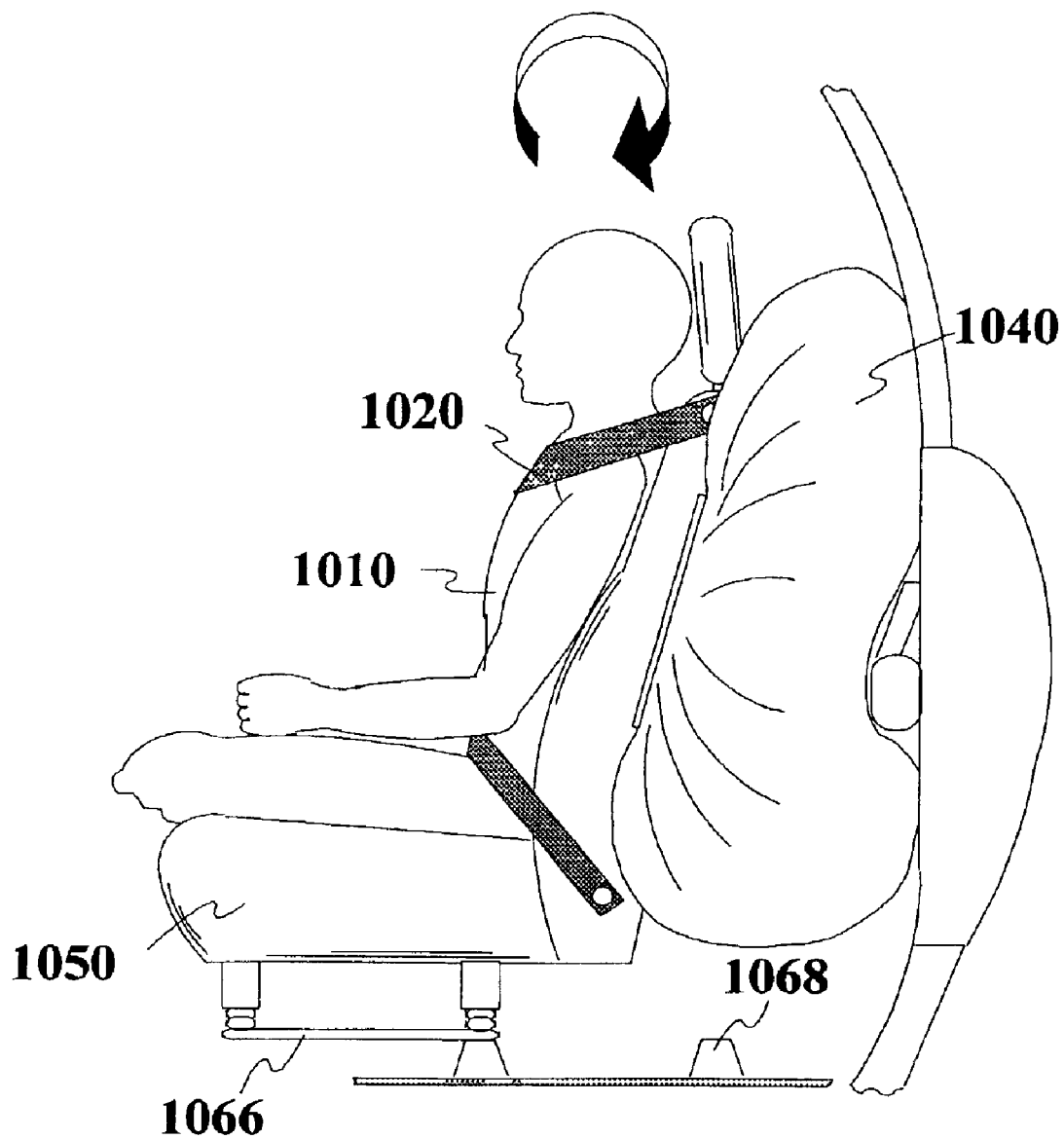
FIG. 10B is a front view of an occupant being restrained by a seatbelt and where the seat is rotated about a vertical axis in conjunction with other apparatus.

In FIG. 10B, a frontal view of an occupant 1010 being restrained by a seatbelt 1020 and wherein the seat 1050 is rotated toward vehicle center, i.e., substantially about an axis perpendicular to a horizontal plane of the vehicle, by deploying airbag 1040 is shown. In this case, the seatbelt 1020 is attached to the seat 1050 as described above with reference to FIG. 8. In this case, rail mechanisms 1066 and mounting locations 1068 permit the seat to be rotated away from the door under the force produced by the deploying airbag 1040. This figure is shown with the occupant rotated 90 degrees from initial position, this amount of rotation may be difficult for all vehicles. However, some degree of rotation about the vertical axis is possible in most vehicles. Rail mechanisms 1066 may include a first member having a curved guide channel and a second member having a projection positioned for a curving or rotational movement in the guide channel of the first member.

As shown in FIG. 10B, the seat 1050 is rotated in a clockwise direction so that the occupant is facing inward during the rotation. The rail mechanism 1066 can be designed to rotate the seat 1050 counterclockwise as well as along any rotational path. For example, in a frontal impact, it might be desirable to rotate the occupant toward the adjacent side door to enable the occupant to exit the vehicle via the side door and/or be extracted from the vehicle via the side door. Otherwise, if the occupant were to be rotated inward, the seat back would be interposed between the occupant and the side door and might hinder egress from the vehicle and extraction of the occupant from the vehicle after the crash.

Figure 10C:
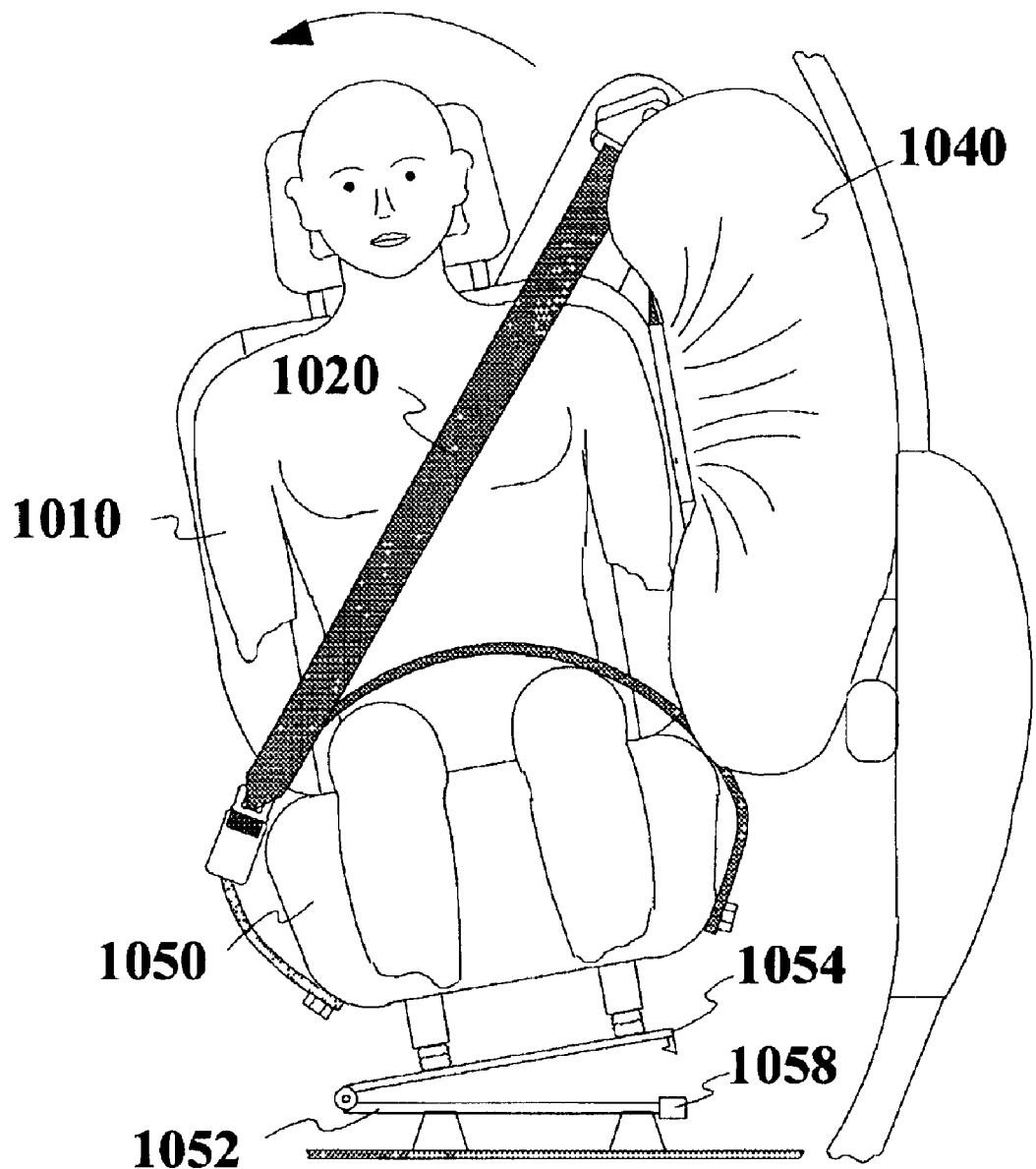
FIG. 10C is a front view of an occupant being restrained by a seatbelt and where the seat is rotated about a longitudinal axis in conjunction with other apparatus.

In an alternate case where there is sufficient space for the occupant's legs and feet, the seat 1050 can be rotated as shown in FIG. 10C, i.e., substantially about an axis oriented in a longitudinal direction of the vehicle. The rotating mechanism comprises a hinged assembly of two plates 1052 and 1054, with plate 1052 attached to the vehicle floorpan and plate 1054 attached to the vehicle seat 1050. The two plates are held together by a suitable clamp 1058 which is released by the sensor at the same time the airbag is deployed.

Other means for tilting the seat 1050 or enabling rotation of the seat 1050 about the vehicle yaw axis or roll axis are also envisioned to be within the scope of the invention.

The displacement of the seat 1050 by the force exerted by the airbag upon its inflation or deployment is thus very useful for increasing the distance between the occupant and the site of the impact, whether it is a side impact, frontal impact or even a rear-impact.

Displacement of the seat 1050 could also be useful in rollover situations where the occupant would want to be displaceable in a particular direction depending on the nature of the rollover. Thus, a rollover sensor would replace the crash sensor, either the anticipatory crash sensor or the actual acceleration or crush sensors described above. Upon detection of a rollover, some action would be taken to inflate an airbag and enable movement of the seat when the force exerted by the inflation of the airbag is effective on the seat. One or more of the seat displacement enabling system could be incorporated into the vehicle so that one or more of these systems activated upon the detection of a rollover, depending on which motion of the seat and occupant would best benefit the occupant.

Many of the techniques disclosed above will not work well for some of today's small vehicles. They are applicable in vans, sport utility vehicles, some small trucks and some minivans. For other vehicles, an externally deployed airbag may be the only assured solution.

Once an anticipatory sensor system is in place, it becomes possible to consider deployment of an airbag external to the vehicle. This possibility has appeared in the automobile safety literature in the past but it has not been practical until the impacting object can be identified and/or an assessment of the probable severity of the accident made. For prior art systems, it has not been possible to differentiate between a plastic sand-filled construction barrier or a cardboard box, for example, neither of which would result in a serious accident (and thus airbag deployment would not be required) and a concrete pillar, tree or wall which would likely result in a serious accident (and thus airbag deployment would be required). With the development of the pattern recognition systems described herein, and in the above referenced patents and patent applications, this problem has been solved and the use of an external airbag now becomes feasible.

Assessment of the probable severity of the impact is preferably accomplished using the different pattern recognition techniques disclosed herein, whereby the identity, size or another property of the object about to impact the vehicle (or with which the vehicle is about to impact) is determined using the pattern recognition technique and the identification or determination of the object's size is considered before initiating deployment of the airbag. In this manner, upon appropriate training of the pattern recognition algorithm, if the vehicle is about to strike a large cardboard box, it will be identified as such and airbag deployment will not occur. On the other hand, if the vehicle is about to strike a large truck, it will be identified as such and airbag deployment will occur. In the prior art, no such differentiation was made about the object involved in the impact based on remote sensing, i.e., sensing prior to impact.

Figure 11A:
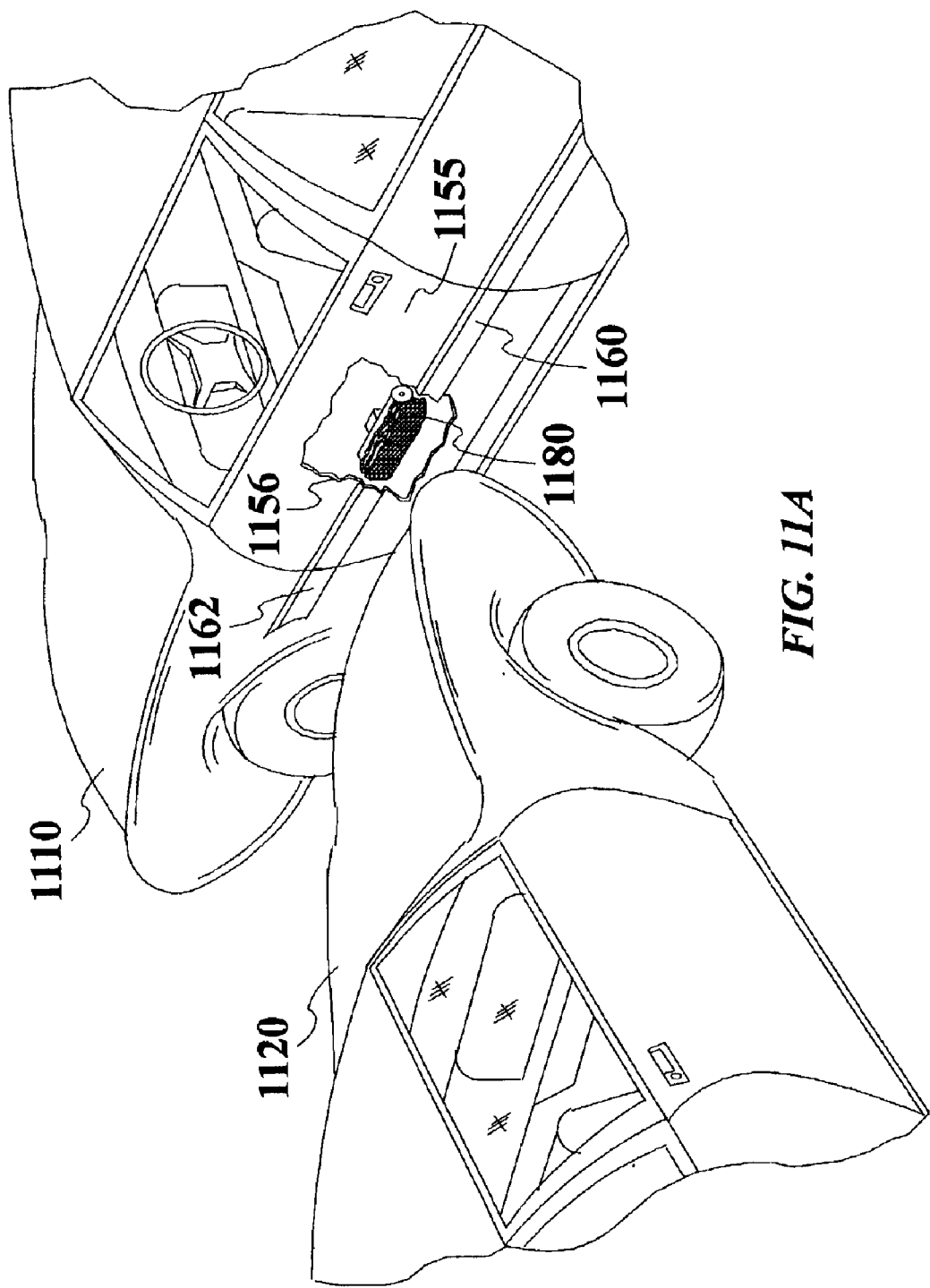
FIG. 11A is a perspective view with portions cutaway and removed of a vehicle about to impact the side of another vehicle showing an airbag stored within the side door of the target vehicle prior to being released to cushion the impact of the two vehicles.

Such a system adapted for side impact protection is shown in FIG. 11A which is a perspective view with portions cutaway and removed of a vehicle 1110 about to be impacted in the side by another vehicle 1120. An airbag module is shown generally as 1180 mounted to the side door of the vehicle 1110 prior to inflation of an airbag 1182 arranged in the airbag module 1180. A portion of the side door of vehicle 1110 has been cutaway to permit viewing of the airbag module 1180. The vehicle 1110 contains a strong support beam 1160 arranged in a longitudinal direction of the vehicle at least partially within the side door(s) 1155 and which provides a reaction surface along with the vehicle door 1155 for the airbag. Upon initiation by the anticipatory sensor, a deployment door, not shown, is opened in an external door panel 1156 by any of a number of methods such as pyrotechnically, permitting the airbag 1182 to emerge from the vehicle door 1155 as shown in FIG. 11B, the airbag 1182 being inflated by inflator means responsive to the detection by the anticipatory sensor that a side impact requiring deployment of the airbag is required.

Figure 11B:
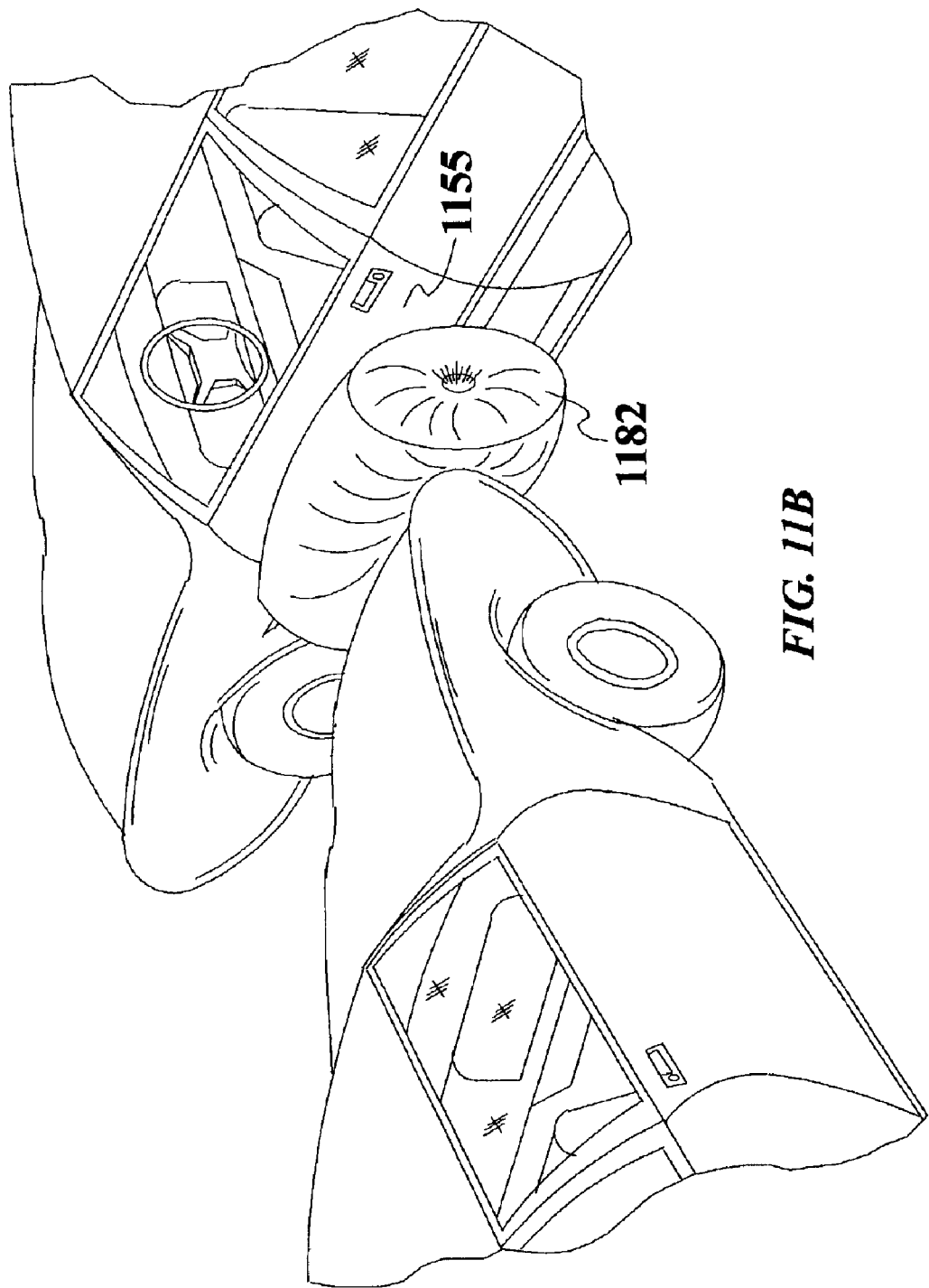
FIG. 11B is a view of the apparatus of FIG. 11A after the airbag has deployed.

Through a system such as illustrated in FIGS. 11A and 11B, the accident can be substantially cushioned prior to engagement between the vehicle and the impacting object. By this technique, an even greater protection can be afforded the occupant especially if an internal airbag is also used. This has the further advantage that the occupant may not have to be displaced from behind the steering wheel and thus the risk to causing an accident is greatly reduced. It also may be the only system which will work with some of today's small vehicles. The anticipatory sensor system could determine whether the impact is one which requires deployment of only the external airbag 1182 or one which requires deployment of both the internal airbag and the external airbag 1182.

Although the description of FIGS. 11A and 11B relates to side impact protection, it is understood that the same concept can be used for frontal impacts and rear impacts and rollover situations. That is, the location of the airbag 1182 is not limited to locations along the side of the vehicle, nor to the side door.

An anticipatory sensor system can thus be installed all around the vehicle, with multiple externally deployable airbags, whereby in use, when a determination is made that an object is about to impact the vehicle, only the airbag(s) which will inflate between the vehicle and the object, and which will cushion the impact, is/are inflated.

Figure 14A:
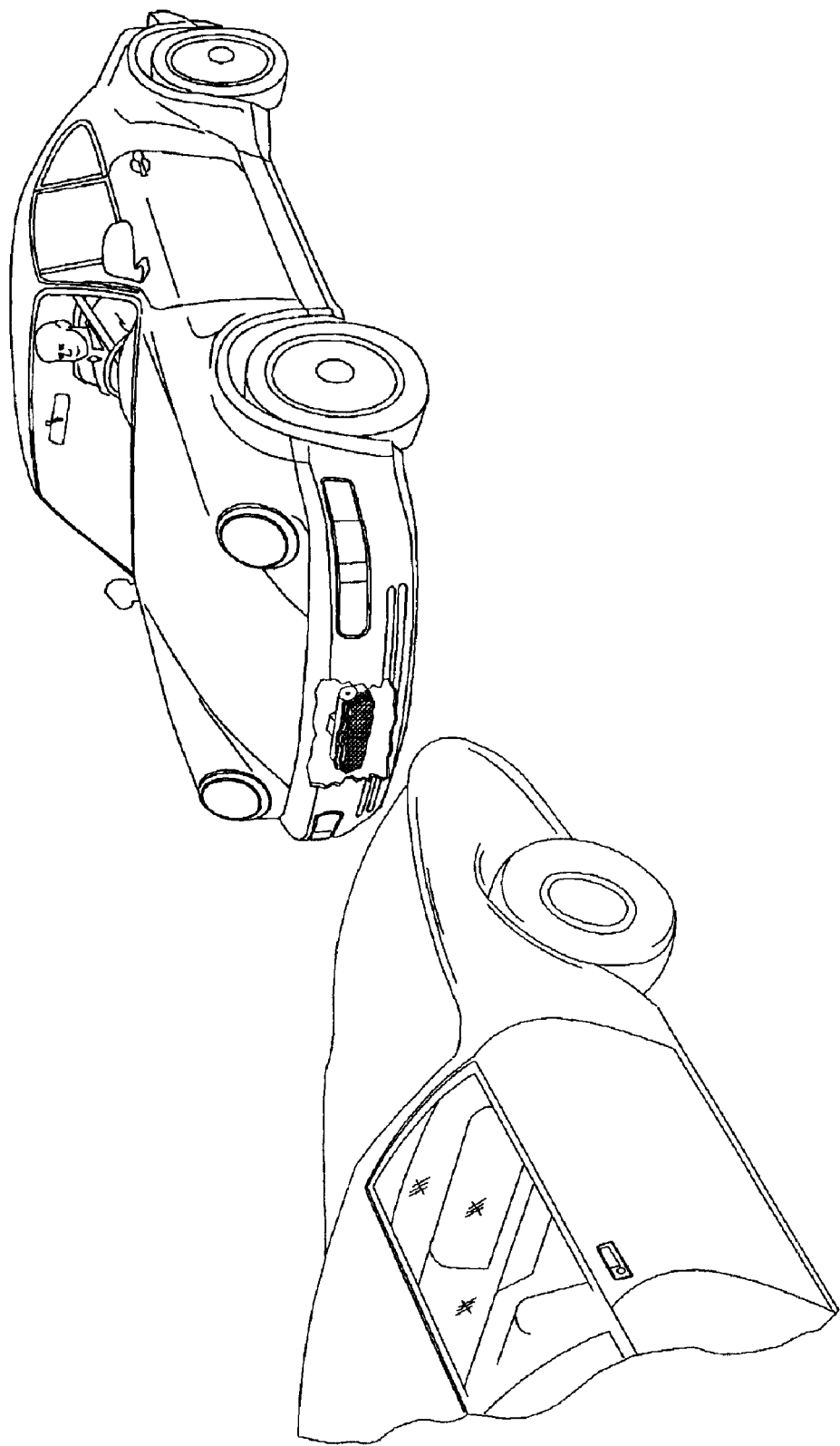
FIG. 14A shows a situation where a vehicle equipped with an externally deployable airbag for frontal impact protection is about to impact another vehicle.
Figure 14B:
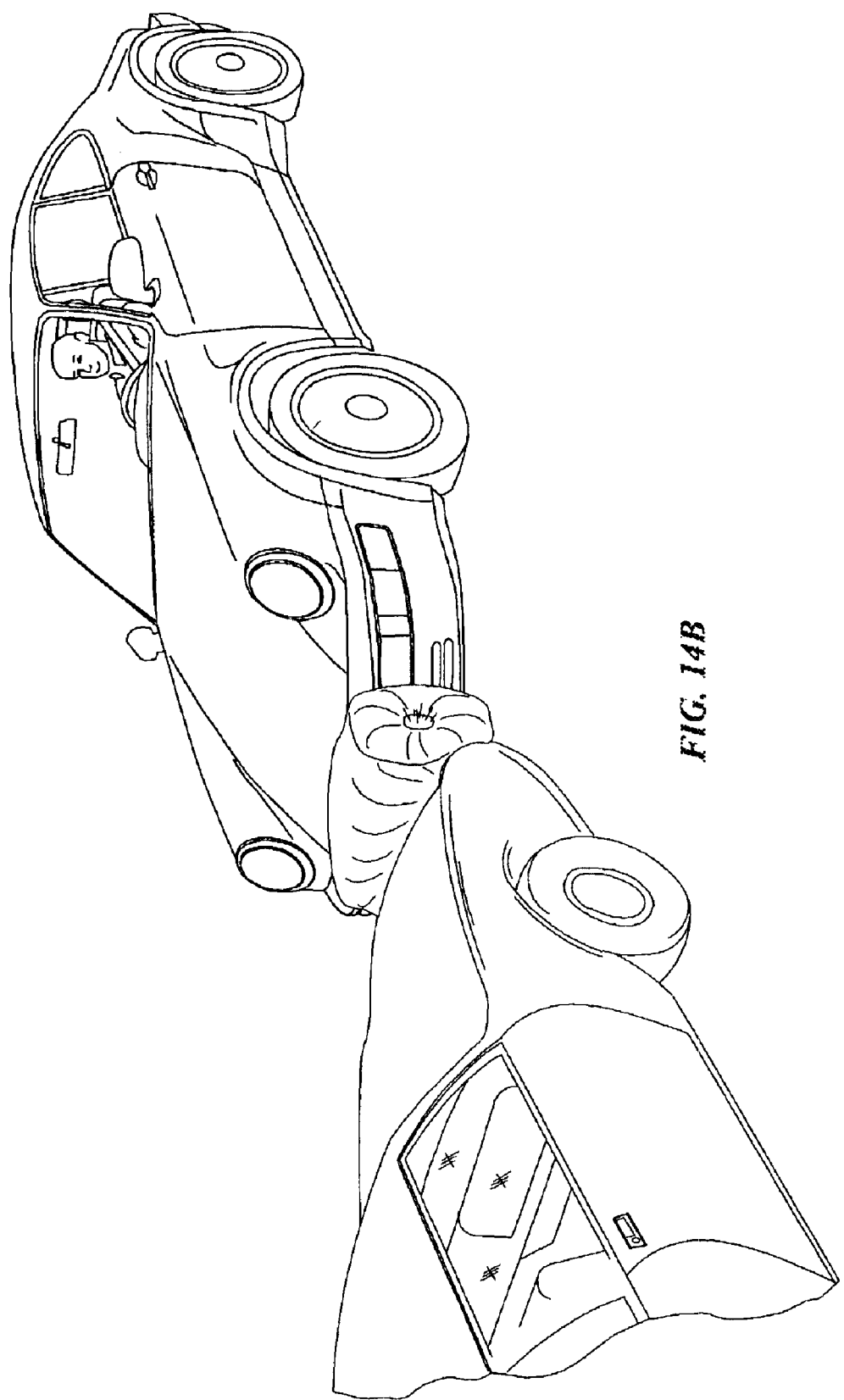
FIG. 14B shows the condition of the vehicles of FIG. 14A at impact.

For example, FIGS. 14A and 14B show an externally deployable airbag mounted at the front of a vehicle so as to provide frontal impact protection. The airbag may be mounted in a housing or module in and/or proximate the bumper, fender, grille, or other part at the front of the vehicle. By using anticipatory sensing and/or exterior object identification as discussed above, the airbag is deployed prior to or at the moment of impact.

Figure 15A:
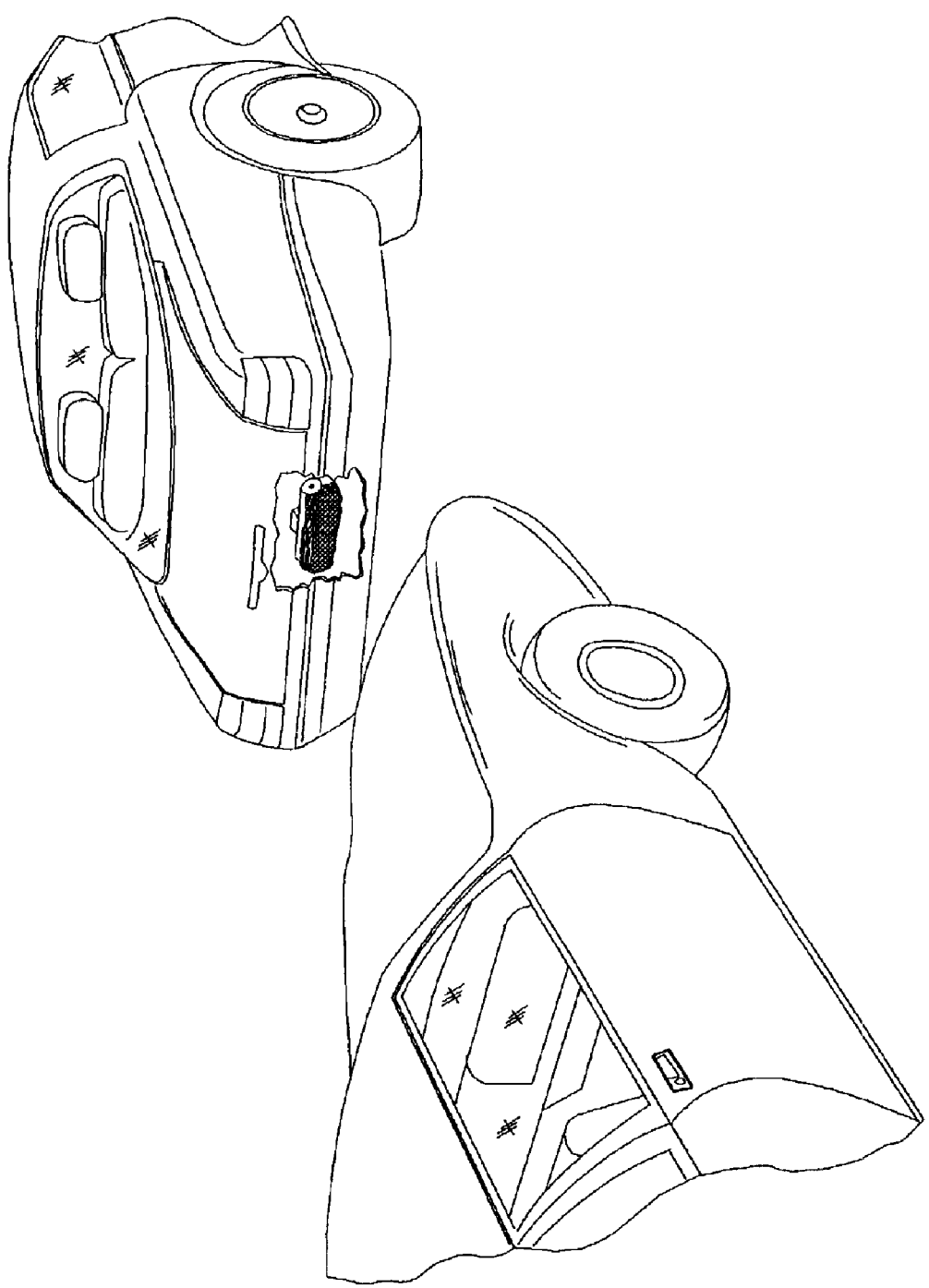
FIG. 15A shows a situation where a vehicle equipped with an externally deployable airbag for rear impact protection is about to be impacted by another vehicle.
Figure 15B:
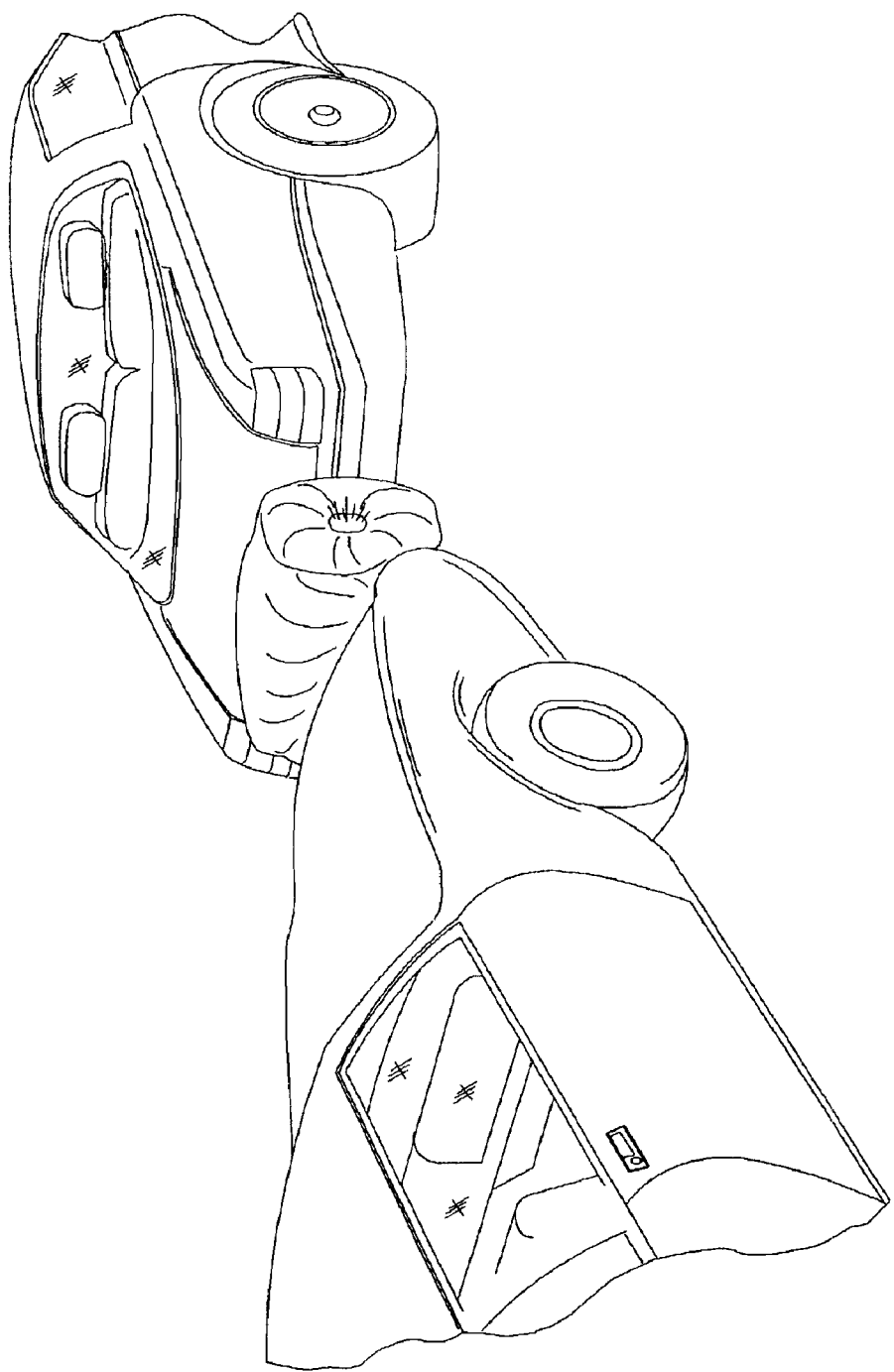
FIG. 15B shows the condition of the vehicles of FIG. 15A at impact.

FIGS. 15A and 15B show an externally deployable airbag mounted at the rear of a vehicle so as to provide rear impact protection. The airbag may be mounted in a housing or module in and/or proximate the bumper or another part at the rear of the vehicle. By using anticipatory sensing and/or exterior object identification as discussed above, the airbag is deployed prior to or at the moment of impact.

Figure 16A:
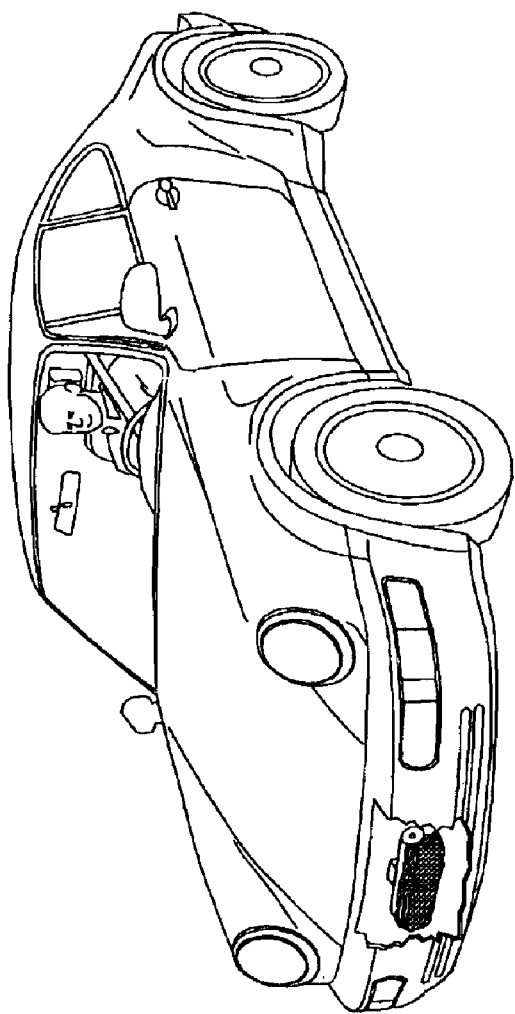
FIG. 16A shows a situation where a vehicle equipped with an externally deployable airbag for frontal impact protection is about to impact a pedestrian.
Figure 16B:
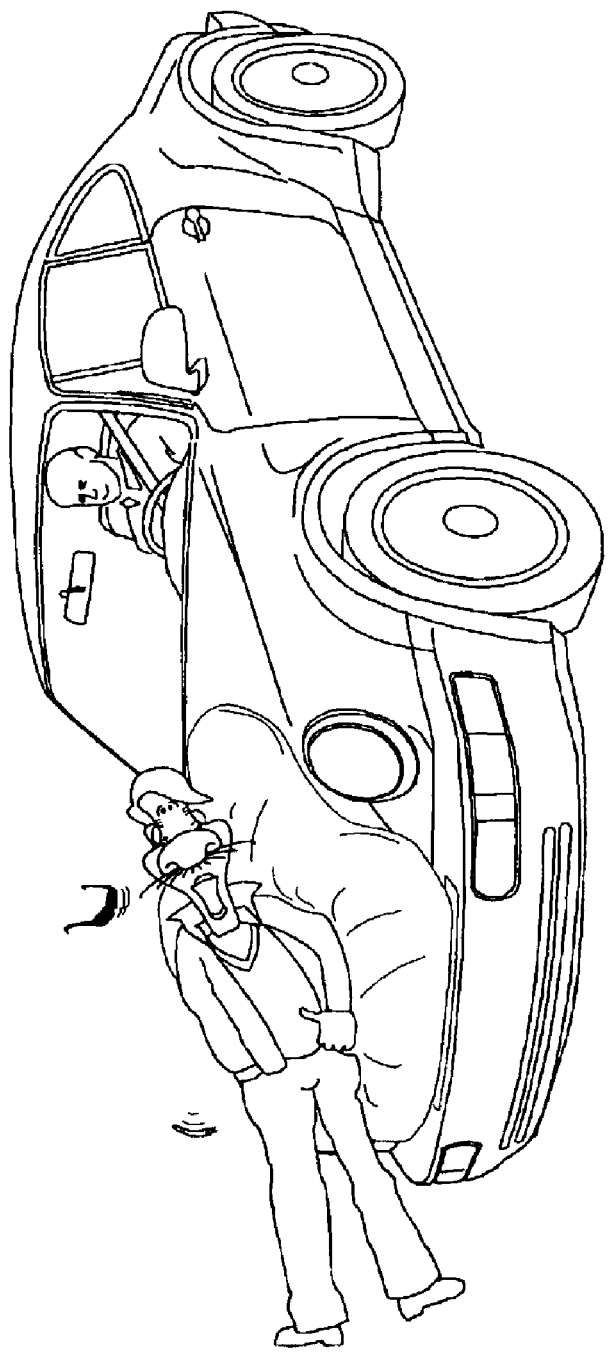
FIG. 16B shows the condition of the vehicle and pedestrian of FIG. 16A at impact.

FIGS. 16A and 16B show an externally deployable airbag mounted at the front of a vehicle for a situation where pedestrian protection is obtained. The airbag may be mounted in a housing or module in and/or proximate the bumper, fender, grille, or other part at the front of the vehicle. By using anticipatory sensing and/or exterior object identification as discussed above, the airbag is deployed prior to or at the moment of impact to protect the pedestrian. It can be seen by comparing FIG. 14B and FIG. 16B that the airbag for pedestrian protection deploys over the hood of the vehicle instead of in front of the vehicle. In a similar manner, an airbag for pedestrian impact protection at the rear of a vehicle would be arranged to deploy over the trunk instead of rearward as shown in FIG. 15B.

In this embodiment, the anticipatory sensor system can be designed to sense an approaching pedestrian or animal and deploy the airbag to cushion the pedestrian's or animal's impact against the vehicle.

It is envisioned that the features of the side impact protection systems, rear impact protection systems, frontal impact protection systems, and pedestrian impact protection systems can be used interchangeably to the extent possible. Thus, features of the side impact protection systems can be used for rear, frontal and pedestrian impact protection.

In another embodiment of the invention using an anticipatory sensor system, a deploying airbag is used to position the occupant. That is, an airbag is arranged and designed to move only a part of the occupant, not necessarily the seat, so as to make room for deployment of another airbag. For example, a shoulder or thorax airbag could be deployed based on a determination from an anticipatory sensor system that a crash is imminent and a determination from an interior monitoring system that the occupant's head is resting against the window. The deploying shoulder or thorax airbag would serve to push the occupant's head away from the window, making room for the deployment of a side curtain airbag between the window and the person's head. Such positioning airbags could be strategically arranged in the vehicle to move different parts of an occupant in a specific direction and then deployed based on the position the occupant is in prior to the impact to change the occupant's status of "out-of-position" vis-a-vis airbag deployment to "in-position".

Figure 17A:
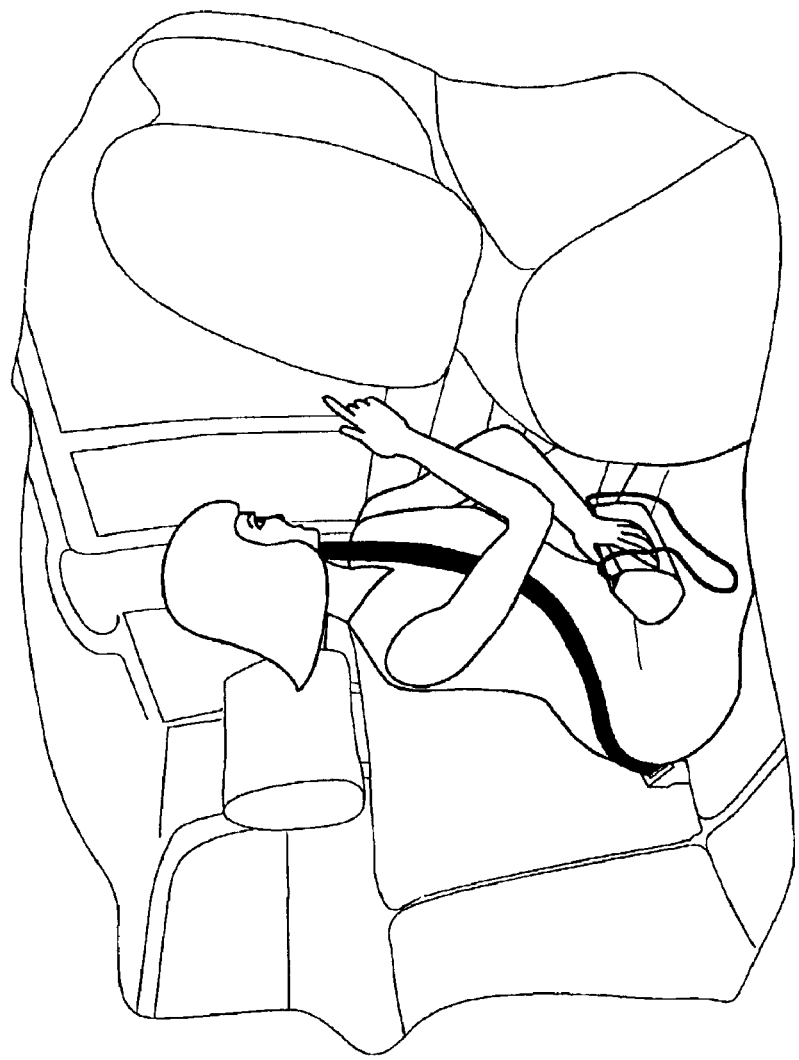
FIGS. 17A, 17B and 17C show one use of positioning airbags in accordance with the invention wherein a passenger is shown leaning against a door in FIG. 17A, a positioning airbag deploys to move the passenger away from the door as shown in FIG. 17B and a side curtain airbag is deployed when the passenger has been moved away from the door as shown in FIG. 17C.
Figure 17B:
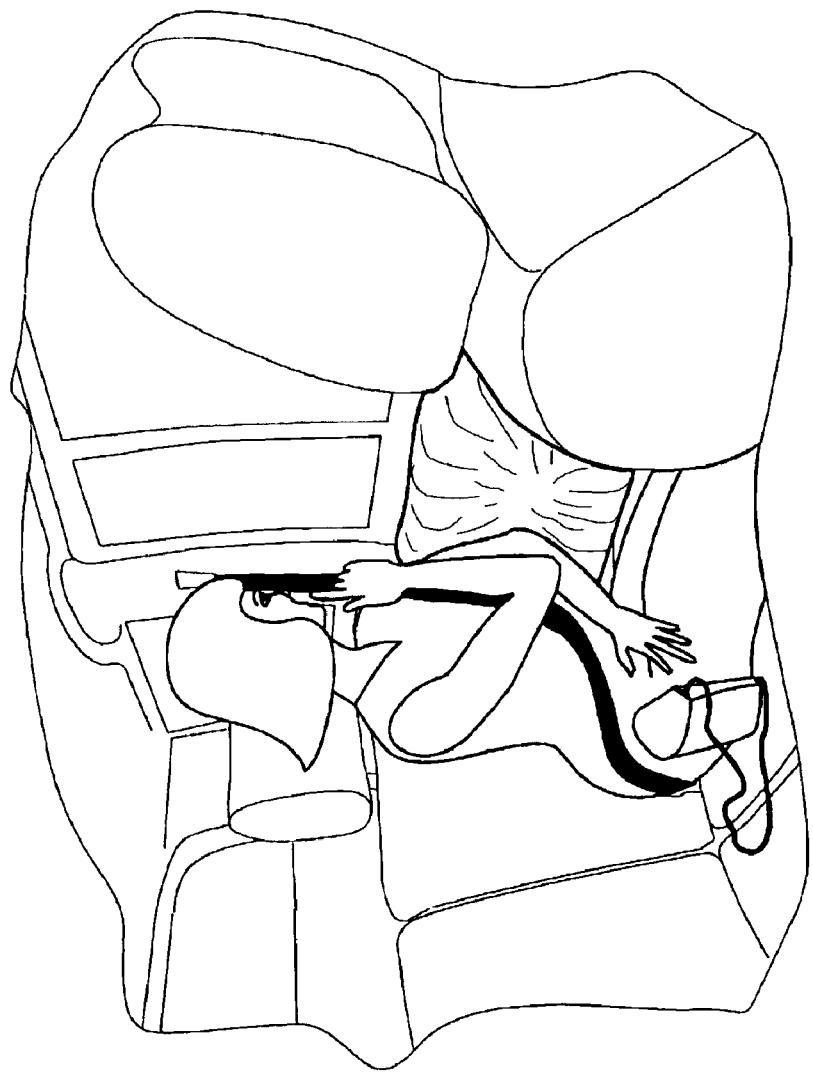
Figure 17C:
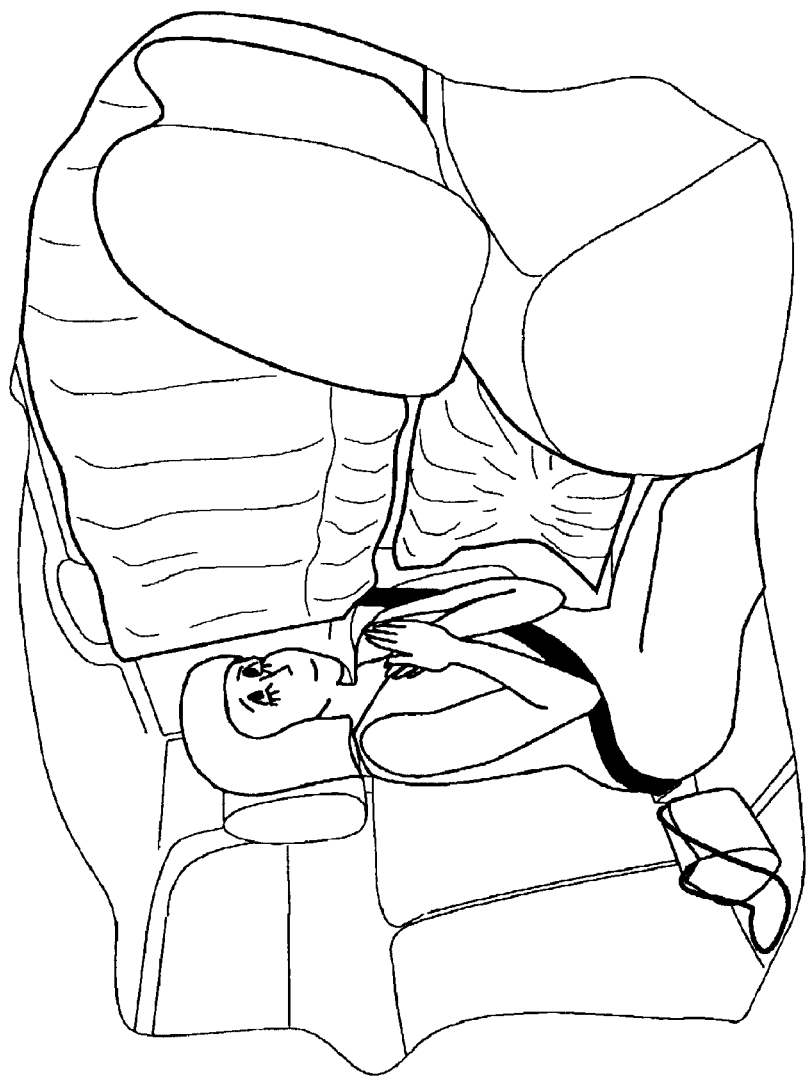

An example of the use of positioning airbags in accordance with the invention is shown in FIGS. 17A, 17B and 17C wherein a passenger is shown leaning against a door in FIG. 17A, a positioning airbag deploys from the door to move the passenger away from the door as shown in FIG. 17B and a side curtain airbag is deployed, e.g., from a location above the window, when the passenger has been moved away from the door as shown in FIG. 17C. Ideally, the passenger or a part thereof would be moved a sufficient distance to enable effective deployment of the side curtain airbag while preventing injury.

Using a positioning airbag, the positioning airbag is preferably deployed before the main airbag or side curtain airbag. Deployment of the positioning airbag could be initiated based on anticipatory sensing of an object about to impact the vehicle, and/or in conjunction with an interior monitoring system or occupant position sensor which would sense the position of the occupant or a part thereof and determine the need to move the occupant or a part thereof to enable deployment of the main airbag or side curtain airbag, or at least to make the deployment more effective. Deployment of the positioning airbag(s) could also be based on an actual detection of a crash involving the vehicle by crush-based sensors or acceleration-based sensors and the like. Determination of the position of the occupant can lead to assessment of a situation when the occupant is out-of-position for deployment and must be moved into a better position for deployment of the main or side curtain airbag. A "better" position for deployment being a position in which the occupant is able to receive more of the benefits of the protective cushion and/or movement prevention provided by the main or side curtain airbag.

The use of positioning airbags is particularly suited for rollovers. In a rollover situation, a vehicle 700 can move sideways toward a curb or highway barrier 702 (FIG. 18A)

and then strike the barrier 702 (FIG. 18B). Upon impact with the barrier 702, the driver 704 is forced toward the driver-side window 706 while the vehicle 700 begins to rollover. At this time, as shown in FIG. 18C, the side curtain airbag 708 deploys downward. However, since the driver 704 is against the window 706, the side curtain airbag 708 may actually deploy inward of the driver 704 thereby trapping the driver 704 between the side curtain airbag 708 and the window 706. Typically the window 706 breaks so that the head of the driver 704 may actually be forced through the broken window. When the vehicle 700 completes the rollover, the driver 704 is forced against the ground and may be seriously injured if not killed (FIG. 18D).

To remedy this situation, the invention contemplates the use of one or more positioning airbags. As such, as shown in FIG. 19B, when the driver 704 is detected to be against the window 706 or simply displaced from a position in which the side curtain airbag 708 will be properly deployed, a positioning airbag 712 is deployed. Such detection of the position of the occupant may be made by any type of occupant sensor including but not limited to a proximity sensor arranged in the door. As shown in FIG. 19B, the positioning airbag 712 is arranged in a door of the vehicle 700 and deploys inward. The positioning airbag 712 may also be arranged in the side of the seat or in the side of the vehicle other than in a door. Also, the positioning airbag 712 can be controlled to deploy whenever deployment of the side curtain airbag 708 is initiated. That is, it is possible to provide a sensor for detecting when side curtain airbag 708 will deploy (for example a rollover sensor) and once such deployment is authorized, the positioning airbag 712 will be deployed prior to deployment of the side curtain airbag 708 to ensure that the driver is properly positioned (See FIGS. 19C and 19D). In this case, the activation mechanism of the positioning airbag 712 is coupled to the control device of the side curtain airbag 708.

Although a side curtain airbag has been illustrated in the various figures herein, this same invention applies when an inflatable tube or tubular airbag, such as manufactured by Simula Inc. of Arizona, is used for retention of an occupants head within the vehicle. Thus, for the purposes herein, a side curtain airbag will encompass such inflatable tube or tubular airbags. Similarly, although they have not been widely used up until now, other systems employing nets have been proposed for this purpose and they are also contemplated by this invention.

In one typical embodiment, the positioning airbag will always be deployed in rollover accidents when the curtain or tubular airbag is deployed and an occupant position sensor is not used. Similarly, the side curtain or tubular airbag is also usually deployed even in side impacts where there is no rollover as it provides protection against the occupant's head striking the intruding vehicle. There is even a strong motivation for deploying both side positioning and curtain or tubular airbags for frontal impacts as control over the position and motion of the occupant is improved.

Finally, although it is desirable to deploy the positioning airbag first, in many cases both airbags are deployed at the same time and the fact that the positioning airbag will deploy more rapidly is relied on to prevent the entrapment of the occupant's head outside of the window. Naturally, the flow of gas into the curtain airbag can be controlled to facilitate this effect.

In a frontal crash when a frontal protection airbag is used, the direction of deployment of the positioning airbag would be substantially perpendicular to the direction of deployment of the frontal airbag. That is, the positioning airbag would deploy in a direction away from the door laterally across the vehicle whereas the main airbag would deployed in a longitudinal direction of the vehicle. The positioning airbag would thus move the occupant laterally to obtain the benefits of the deployment of the frontal airbag. However, the angle between the deployment direction of the positioning airbag and the deployment direction of main or side curtain airbag can vary. In fact, it is conceivable that the deployment directions are the same whereby if an occupant is too close to the deployment door or location of the main airbag, then a smaller positioning airbag is deploy to push the occupant away from the deployment door and only once the occupant is sufficiently distant from the deployment location is the main airbag deployed. Monitoring of the position of the occupant is useful to determine when the positioning airbag need to be deployed and if and when the occupant is moved a sufficient distance by the deployment of the positioning airbag so as to be positioned in a proper position for deployment of the main or side curtain airbag.

The timing of the deployments of the positioning airbag and main airbag, or the positioning airbag and side curtain airbag, can take into account the distance the occupant must be moved, i.e., the position of the occupant. This can ensure that the occupant is not moved too far by the positioning airbag out of the range of protection provided by the main airbag. The timing can thus be based on the position and/or weight of the occupant. The timing of the deployments can also or alternatively be based on the characteristics or properties of the occupant, i.e., the morphology of the occupant. For example, different deployment scenarios can be used depending on the weight of the occupant since a lighter occupant would move faster than a heavier occupant.

The rate of deployment of the main or side curtain airbag can also be varied so that it deploys more slowly than the positioning airbag. As such, the positioning airbag will have its positioning effect first and only thereafter will the main or side curtain airbag have its protective effect. The rate of deployment of the airbags can be varied in addition to the timing of the deployments.

Although the use of positioning airbags is described above with reference to FIGS. 19A–19D for a driver, it is understood that such positioning airbag can be used for each seating location in the vehicle. Also, one airbag can be used for multiple seating locations, for example, seating locations on the same side of the vehicle.

The manner in which the positioning airbag is deployed is illustrated in FIG. 20 wherein the first step is to detect a rollover or other crash situation at 714. Such detection may be based on anticipatory crash sensing. The occupant's position (present or future) may then determined or monitored at 716. For multiple occupants, the position of each occupant can be determined at that time or it is conceivable that the occupant's position at a set time in the future is extrapolated, for example, based on the occupant's current position and velocity, the occupant's position in the immediate future can be calculated using the equation that the future position equals the current position plus the velocity times the time differential. A determination is made at 718 whether the occupant is "out-of-position" which in the rollover situation would be too close to the window. If not, then the side curtain airbag is deployed at 722. If yes, a positioning airbag is deployed at 724 to move the occupant into an appropriate position for deployment of the side curtain airbag. Optionally, the occupant's position can be determined after deployment of the positioning airbag at 726 or extrapolated based on the imparted velocity to the occupant from the deploying positioning airbag. If the position of the occupant is proper for deployment of the side curtain airbag or will be proper for the deployment of the side curtain airbag, then the side curtain airbag is deployed at 722.

Positioning airbags can be arranged at different locations throughout the vehicle with each one designed to move one or more occupants in a desired direction. A control unit for the positioning airbags, which may be a processor coupled to a crash sensor system (anticipatory or other) and occupant position determining system, determines which positioning airbag(s) are to be deployed based on the position of the occupant(s).

Figure 21:
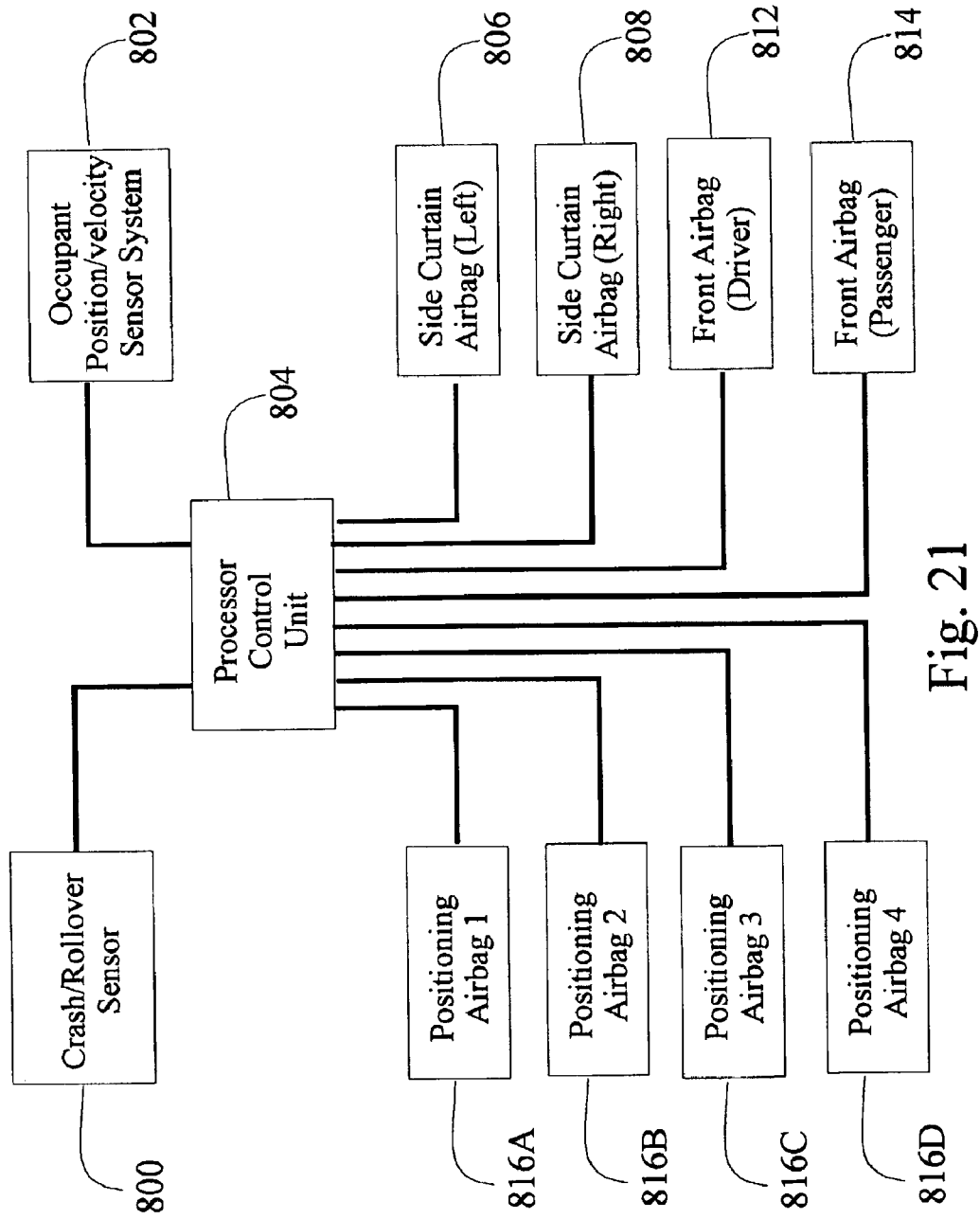
FIG. 21 is a schematic of the apparatus for deploying multiple airbags in accordance with the invention.

With reference to FIG. 21, the general components of an apparatus for deploying multiple airbags in accordance with the invention are shown schematically. A crash sensor system 800 is arranged on the vehicle and may include one or more anticipatory crash sensors, crush crash sensors or acceleration-based crash sensors. An occupant position/velocity sensor system 802 is arranged on the vehicle to monitor the presence and position of the occupants and optionally determine the velocity of the occupants. The sensor system 802 can be any known system in the prior art including those disclosed in the assignee's U.S. patents reference above. Sensor system 802 can also include sensors which measure a morphological characteristic or property of the occupant such as the occupant's weight. The crash sensor system 800 and occupant sensor system 802 are coupled to a processor/control unit 804. Control unit 804 receives input from the crash sensor system 800 as to an expected crash involving the vehicle (when the crash sensor system 800 includes an anticipatory sensor) or an actual crash or rollover involving the vehicle. Control unit 804 determines which protective airbags need to be deployed, if any, to protect the occupants. Such protective airbags include the side curtain airbag on the left side of the vehicle 806, the side curtain airbag on the right side of the vehicle 808, the front airbag on the left side of the vehicle 812, the front airbag on the right side of the vehicle 814, and others Control unit 804 also determines whether any of the positioning airbags 1–4 (elements 816A–816D) need to be deployed prior to and/or in conjunction with the deployment of the protective airbags. Although generally the positioning airbags are deployed prior to the deployment of the protective airbags in order to properly position an occupant, the positioning airbags could be deployed whenever the vehicle experiences a crash or rollover to provide some added cushioning. Positioning airbag 1 could be associated with the side curtain airbag on the left side of the vehicle and effective to move the occupant(s) away from the left side of the vehicle. Positioning airbag 2 could be associated with the side curtain airbag on the right side of the vehicle and effective to move the occupant(s) away from the right side of the vehicle. Positioning airbags 3 and 4 would serve to deploy to position the occupants for deployment of the respective frontal airbags.

Control unit 804 can determine the timing of the deployment of the positioning airbag and associated protective airbag, i.e., the time differential between the initiation of the inflation which will be optimum to allow the occupant time to be moved by the positioning airbag into position to be protected by the protective airbag. Control unit 804 can also determine the rate of inflation of the positioning and protective airbags, when such airbags are provided with the capability of variable inflation rates. In this case, the protective airbag may be deployed at the same time as the positioning airbag (or possibly even before) but the protective airbag inflates more slowly than the positioning airbag. Control unit 804 can also factor in the morphology of the occupant to be protected when determining the inflation parameters, i.e., the timing difference and rate of inflation. This is useful since weight of the occupant affects the occupant's movement, i.e., a heavier occupant will be moved more slowly than a lighter occupant.

In general terms, disclosed above is an inflator system for inflating an airbag which comprises gas inflow means for inflating the airbag with gas, vent means for controlling removal of gas from the airbag, a first anticipatory crash sensor for determining that a crash requiring deployment of the airbag will occur based on data obtained prior to the crash and, upon the making of such a determination, directing the gas inflow means to inflate the airbag, and a second crash sensor for determining that a crash requiring deployment of the airbag will occur or is occurring and, upon the making of such a determination, controlling the vent means to enable the removal of gas from the airbag whereby the pressure in the airbag is changed by the removal of gas therefrom enabled by the vent means.

The gas inflow means may be in the form of an inflator which is activated to produce gas and release the gas through conduits into the interior of the airbag. The gas inflow means can also be in the form of a tank of pressurized gas and a valve in a conduit leading from the tank to the interior of the airbag whereby opening of the valve causes flow of gas from the tank into the airbag. Any other type of structure or method which serves to cause accumulation of gas in the interior of the airbag can also be used as gas inflow means in accordance with the invention. The gas inflow means can also constitute multiple inflators which are independently activated based on, the severity of the anticipated crash. In this case, one inflator would be activated for a minor or average crash whereas for a more severe crash, two or more inflators would be activated thereby increasing the flow of gas into the airbag and the inflation rate and/or pressure therein. Each inflator could be controlled by the same or a different crash sensor.

The vent means may be in the form of a variable outflow port or vent integral with the airbag, e.g., a flap built in an exterior surface of the airbag and providing a regulatable conduit between the interior of the airbag and exterior of the airbag (regulatable both with respect to the amount of gas flowing therethrough and/or the rate of gas flowing therethrough). The vent means may also be in the form of a conduit leading from the interior of the airbag to the exterior of the airbag and having a regulatable valve in the conduit whereby regulated opening of the valve causes removal of gas from the interior of the airbag.

The airbag may be, but is not required to be, a side airbag arranged to inflate between the occupant and the side door. Regardless of the direction of the crash which will causes deployment of the airbag, it is beneficial to provide some form of occupant displacement permitting means arranged in connection with the seat for permitting the occupant to be displaced away from the airbag mounting surface upon inflation of the airbag and thereby increase the space between the occupant and the airbag mounting surface. Thus, if the airbag is a side airbag mounted in the side door, it is beneficial to enable displacement of the occupant away from the side door. Such occupant displacement permitting or enabling means may be in the form of some structure which introduces slack into the seatbelt in conjunction with the deployment of the airbag or a mechanism by which the seat can be moved or is actually moved away from the side door, e.g., tilted inward.

The airbag can also be arranged to inflate to protect a rear-seated occupant and to this end, would be arranged in a back portion of the seat, attached to the back portion of the seat and/or integral with the back portion of the seat.

For any positioning and use, the airbag can be arranged in a housing of an airbag module. The airbag module could extend substantially along a vertical length of the back portion of the seat for a side airbag.

Another embodiment of the inflator system comprises inflator means for releasing a gas into the at least one airbag, a first anticipatory crash sensor for determining that a crash requiring deployment of the airbag will occur based on data obtained prior to the crash and, upon the making of such a determination, triggering the inflator means to release gas into the airbag, and a second crash sensor for determining that a crash requiring deployment of the airbag will occur or is occurring and, upon the making of such a determination, changing the rate at which gas accumulates in the airbag. To this end, the second crash sensor is structured and arranged to control outflow of gas from the airbag. Outflow of gas from the airbag may be controlled via a variable outflow port.

A method for inflating an airbag comprises the steps of making a first determination by means of an anticipatory crash sensor that a crash requiring deployment of the airbag will occur based on data obtained prior to the crash and, upon the making of such a determination, inflating the airbag, and making a second, separate determination by means of a second crash sensor that a crash requiring deployment of the airbag will occur or is occurring and, upon the making of such a determination, changing the rate at which gas accumulates in the airbag. The rate at which gas accumulates in the airbag may be changed by enabling and regulating outflow of gas from the airbag.

In accordance with another embodiment of the invention, a vehicle comprises one or more inflatable airbags deployable outside of the vehicle, an anticipatory sensor system for assessing the probable severity of an impact involving the vehicle based on data obtained prior to the impact and initiating inflation of the airbag(s) in the event an impact above a threshold severity is assessed, and an inflator coupled to the anticipatory sensor system and the airbag for inflating the airbag when initiated by the anticipatory sensor system. The airbag may be housed in a module mounted along a side of the vehicle, in a side door of the vehicle, at a front of the vehicle or at a rear of the vehicle.

The anticipatory sensor system may comprise at least one receiver for receiving waves or energy and a pattern recognition system, e.g., data storage medium embodying a pattern recognition algorithm or neural network, for analyzing the received waves or energy or data representative of the received waves or energy to assess the probable severity of the impact. The pattern recognition system may also be designed to identify an object from which the waves or energy have been emitted or generated, in which case, the assessment of the probable severity of the impact is at least partially based on the identification of the object. The pattern recognition system can also be designed to determine at least one property of an object from which the waves or energy have been emitted or generated, in which case, the assessment of the probable severity of the impact is at least partially based on the determined at least one property of the object.

Also disclosed herein is an airbag passive restraint system for protecting an occupant adjacent the door in a side impact which comprises an airbag arranged to inflate between the door and the occupant and a side impact anticipatory sensor for determining that an accident requiring deployment of the airbag is about to occur prior to the accident. The sensor is arranged to receive waves generated by, modified by or reflected from an object about to impact the vehicle resulting in the accident and comprises identifying and determining means for identifying the object based on a pattern of the received waves and determining whether the identified object will cause an accident requiring deployment of the airbag. The system also includes an inflator coupled to the sensor for inflating the airbag if the sensor determines that an accident requiring deployment of the airbag is about to occur. The identifying and determining means may comprise a neural network trained on data of possible patterns of received waves in conjunction with an identification of the object the received waves have been generated by, modified by or reflected from. In the alternative, the identifying and determining means may comprise a fuzzy logic algorithm or a rule based pattern recognition algorithm. The sensor may be arranged to receive electromagnetic waves or acoustic waves.

Another disclosed embodiment of a system for triggering deployment of an airbag passive restraint system in anticipation of an accident between the vehicle and an object approaching the vehicle comprises transmitter means arranged on the vehicle for sending waves toward the object, receiver means arranged on the vehicle for receiving modified or reflected waves from the object and producing a signal representative of the waves, identifying and determining means for identifying the object based on a pattern of the received waves and determining whether the identified object will cause an accident requiring deployment of the passive restraint system and triggering means responsive to the identifying and determining for initiating deployment of the passive restraint system if the identifying and determining means determines that an accident requiring deployment of the passive restraint system is about to occur. The transmitter means may be arranged to transmit electromagnetic waves, such as radar waves, or ultrasonic waves. The identifying and determining means may comprise a neural network trained on data of possible patterns of received waves in conjunction with an identification of the object the received waves have been modified by or reflected from, a fuzzy logic algorithm or a rule based pattern recognition algorithm. The transmitter means may also comprise a laser transmitter and the receiver means comprise a charge coupled device or CMOS sensing array.

Still another disclosed embodiment of a system for triggering deployment of an airbag passive restraint system in anticipation of an accident between the vehicle and an object approaching the vehicle comprises receiver means for receiving electromagnetic waves generated, reflected or modified by the object, identifying and determining means for identifying the object based on a pattern of the received waves and determining whether the identified object will cause an accident requiring deployment of the passive restraint system and triggering means responsive to the identifying and determining means for initiating deployment of the passive restraint system if the identifying and determining means determines that an accident requiring deployment of the passive restraint system is about to occur. The receiver means may be arranged to receive light waves or infrared waves. As in the embodiments discussed above, the identifying and determining means may comprise a neural network trained on data of possible patterns of received waves in conjunction with an identification of the object the received waves have been generated, reflected or modified by, a fuzzy logic algorithm or a rule based pattern recognition algorithm. The receiver means may comprise a charge-coupled device or CMOS sensing array.

Also disclosed is a method for controlling deployment of a passive restraint system in anticipation of an accident with an approaching object which comprises the steps of mounting at least one receiver on the vehicle to receive waves generated by, modified by or reflected from an object exterior of the vehicle, conducting training identification tests on a plurality of different classes of objects likely to be involved in a vehicular accident, each of the tests comprising the steps of receiving waves generated by, modified by or reflected from the object by means of the receiver(s) and associating an object class with data from each test, and generating an algorithm from the training test results, associated object classes and an indication as to whether deployment of the passive restraint system is necessary such that the algorithm is able to process information from the received waves from the receiver(s), identify the class of the object and determine whether deployment of the passive restraint system is necessary. During operational use, a plurality of waves generated by, modified by or reflected off an object exterior of the vehicle are received by means of the receiver(s) and the algorithm is applied using the received waves as input to identify the object exterior of the vehicle and determine whether deployment of the passive restraint system is necessary. At least one transmitter may be mounted on the vehicle to transmit waves toward the object exterior of the vehicle such that the waves are reflected off or modified by the object exterior of the vehicle and received by the receiver(s).

In some implementations, the sensor system may include a variable inflation rate inflator system for inflating the airbag(s). Such an inflator system comprises inflator means for releasing a gas into the airbag(s), a first anticipatory crash sensor for determining that a crash requiring an airbag will occur based on data obtained prior to the crash and, upon the making of such a determination, triggering the inflator means to release gas into the airbag(s) to thereby inflate the same at a first inflation rate, a second crash sensor for determining that a crash requiring an airbag will occur or is occurring and, upon the making of such a determination, affecting the inflator means such that an additional quantity of gas is released thereby into the airbag(s) to thereby inflate the same at a second inflation rate greater than the first inflation rate. The inflator means may comprise first and second inflators structured and arranged to produce gas and direct the gas into the airbag(s) and which are independent of one another such that the first inflator may be triggered by the first anticipatory sensor without triggering of the second inflator and the second inflator may be triggered by the second crash sensor without triggering of the first inflator.

In conjunction with the variable inflation rate inflator system described above, a method for providing a variable inflation rate of the airbag(s) is also envisioned. Such a method would entail determining that a crash requiring an airbag will occur based on data obtained prior to the crash, e.g., by an anticipatory sensor, and upon the making of such a determination, triggering an inflator to release gas into the airbag(s) to thereby inflate the same at a first inflation rate, determining in another manner that a crash requiring an airbag will occur or is occurring and, upon the making of such a determination, affecting the inflator such that an additional quantity of gas is released thereby into the airbag (s) to thereby inflate the same at a second inflation rate greater than the first inflation rate. Thus, the airbag is inflated either at the first inflation rate, i.e., if the conditions do not warrant a more powerful inflation, or the second, higher inflation rate, i.e., if the conditions warrant an inflation of the airbags as rapidly as possible. The inflator may comprise a first and second inflator each of which produces gas and directs the gas into the airbag(s) and which are independent of one another such that the first inflator may be triggered by the initial determination of a crash requiring the airbag deployment without triggering of the second inflator and the second inflator may be triggered by the subsequent determination of a crash requiring airbag deployment without triggering of the first inflator.

Furthermore, the anticipatory sensor system described above may be used in conjunction with an airbag passive restraint system for protecting an occupant sitting in the seat adjacent the side door. Such a restraint system may comprise one or more airbag(s) arranged to be inflated between the occupant and the side door, sensor means for detecting that a crash requiring deployment of the airbag(s) is required, inflator means for releasing a gas into the airbag(s) to inflate the same and which are coupled to the sensor means and triggered thereby to release gas into the airbag(s) in response to the detection by the sensor means of a crash requiring deployment of the airbag(s), a seatbelt coupled to the seat for restraining the occupant on the seat and occupant displacement permitting means arranged in connection with the seat for permitting the occupant to be displaced away from the side door upon inflation of the airbag(s) and thereby increase the space between the occupant and the side door.

The occupant displacement permitting means may take a number of different forms all of which serve to enable the occupant to be displaced away from the side door, and if applied in conjunction with an airbag inflating between the side door and the occupant, the inflating airbag may provide a force which serves to actually displace the occupant away from the side door. One embodiment of the occupant displacement permitting means comprises slack introduction means arranged in connection with the seatbelt for introducing a controlled amount of slack into the seatbelt. Alternatively, the occupant displacement permitting means comprise means for changing an anchorage point of the seatbelt from a first anchorage point to a second anchorage point upon inflation of the airbag, both of which may be arranged on a side of the seat away from the side door. The second anchorage point is permanently fixed to the vehicle whereas the first anchorage point is defined by a strip permanently fixed to the vehicle, a first member is connected thereto, and a second member has a first position connected to the first member in which the seatbelt is retained at the first anchorage point and a second position apart from the first member in which the seatbelt is not retained at the first anchorage point. Separation means, such an explosive bolt assembly, are coupled to the sensor and move the second member from the first position to the second position so that the seatbelt is no longer retained at the first anchorage point and the displacement of the occupant is not hindered by the seatbelt.

In another embodiment, the system includes mounting means for mounting the airbag adjacent the occupant and the sensor is an anticipatory sensor structured and arranged to detect that a crash requiring deployment of the airbag is required based on data obtained prior to the crash such that the inflator means are triggered to release gas into the airbag prior to the start of the crash. In this case, the occupant displacement permitting means are optionally operatively associated with the anticipatory sensor and the seat to increase the space between the occupant and the side door upon inflation of the airbag. The occupant displacement permitting means may comprise means for laterally displacing the seat away from the side door such as one or more rail mechanisms, each including a first member having a guide channel arranged in connection with the seat or the vehicle and a second member positioned for movement in the guide channel arranged in the other of the seat and the vehicle. Alternatively, the occupant displacement permitting means comprise means for rotating the seat about the vehicle roll axis, possibly also by rail mechanisms, means for rotating the seat about the vehicle yaw axis or means for lifting the seat vertically. The seat lifting means may comprise a first plate attached to the seat, a second plate attached to the vehicle and hingedly attached to the first plate, and a clamp for releasably retaining the first plate in connection with the second plate.

Any of the airbag passive restraint systems described herein may be used in conjunction with the variable inflation rate inflator system described above, and may be used in conjunction with one another to optimize protection for the occupant.

In conjunction with the airbag passive restraint system for protecting an occupant sitting in the seat adjacent the side door described above, the present invention also envisions a method for protecting such an occupant. Such a method would include the steps of detecting that a crash requiring deployment of one or more airbags is required, if so, releasing a gas into the airbag(s) to inflate the same and then in before, during or after the gas is released into the airbag, causing the occupant to be displaced away from the side door upon inflation of the airbag(s) to thereby increase the space between the occupant and the side door. The manner in which the occupant is caused to be displaced away from the side door may take any of the forms described herein.

Other methods for protecting an adjacent occupant in a side impact within the scope of the invention includes the steps of mounting an airbag module comprising a housing and an inflatable airbag arranged within the housing in combination with a seat back, detecting that a side impact requiring deployment of the airbag is required based on data obtained prior to the crash, e.g., by an anticipatory sensor, and then inflating the airbag in the event a side impact requiring deployment of the airbag is detected prior to the start of the impact.

Another possible method entails the use of an externally deployable airbag system for protecting the occupant in a side impact with an impacting object. This method would include the steps of determining that a side impact requiring deployment of an airbag outside of the vehicle between the side of the vehicle and the impacting object is required based on data obtained prior to the crash, and then inflating the airbag in the event a side impact requiring deployment of the airbag is detected.

Some embodiments of inventions disclosed above comprises an anticipatory crash sensor arrangement which provides information about an object such as a vehicle about to impact the resident vehicle, i.e., the vehicle in which the anticipatory crash sensor arrangement is situated, and causes inflation of one or more airbags. For example, internal and/or external airbags might be deployed. One particular embodiment comprises an anticipatory sensor system which uses (i) a source of radiant energy either originating from or reflected off of an object or vehicle which is about to impact the side of a target vehicle, plus (ii) a pattern recognition system to analyze the radiant energy coming from the soon-to-be impacting object or vehicle to (iii) assess the probable severity of a pending accident and (iv) if appropriate, inflate an airbag prior to the impact so as to displace the occupant away from the path of the impacting object or vehicle to create space required to cushion the occupant from an impact with the vehicle interior. Instead of or in addition to inflation of an airbag in the interior of the vehicle, an airbag may be inflated exterior of the vehicle to resist the force of the colliding object and thereby reduce the severity of the collision.

Although the primary area of application of some embodiments of inventions disclosed herein is for protection in side impacts, embodiments of the invention also provide added protection in frontal impacts by reducing the incidence of injury to out-of-position occupants by permitting a slower inflation of the airbag and displacing the occupant away from the airbag prior to the impact. Additionally, it can provide added protection in rear impacts by reducing the incidence of injury caused by impacts of the occupant's head with the headrest by prepositioning the headrest adjacent the head of the occupant based on an anticipatory rear impact sensor.

In a combined airbag inflation and occupant displacement enabling system disclosed above, a seat is movably attached to a floor pan of the vehicle for supporting an occupant, at least one airbag is arranged to be inflated to protect the occupant during a crash, an inflator or plurality of inflators is/are arranged to inflate the airbag(s), and an anticipatory sensor is coupled to the sensor and the inflator and determines that a crash will occur based on data obtained prior to the crash. In this case, the inflator(s) is/are triggered by the anticipatory sensor to inflate the airbag(s). An occupant displacement system is coupled to the anticipatory sensor for displacing or enabling displacement of the occupant based on the determination of the impending crash by the anticipatory sensor. The occupant displacement system can be a system for introducing slack into the seatbelt prior to the impact to allow the occupant to move upon impact. The occupant displacement system can also be one or more positioning airbags, which are inflated prior to the crash to move or position a part of the occupant so that the occupant is in a better or correct position for deployment of a main protective airbag.

Instead of an anticipatory sensor, a crash sensor based on acceleration or crush or another property of the vehicle can be used. In this case, the crash sensor would determine that a crash is occurring requiring deployment of the airbag(s) after the crash has begun. Nevertheless, the seat can be designed to move automatically in order to optimize and maximize the deployment of the airbag(s) upon determination of a crash regardless of the manner in which the crash is determined.

Another crash sensor arrangement may be resident on the vehicle and provides information about the impact which may be used to adjust the pressure in the airbag based on the information about the impact, if any such adjustment is determined to be required. Adjustment of the pressure may entail increasing the pressure in the airbag by, directing additional gas into the airbag(s), or releasing a control amount and/or flow of gas from the airbag(s).

Although several preferred embodiments are illustrated and described above, there are possible combinations using other geometries, sensors, materials and different dimensions for the components that perform the same functions. This invention is not limited to the above embodiments and should be determined by the following claims.

What is claimed is:

1. In a motor vehicle, an apparatus for deploying airbags comprising:

a first inflatable airbag for protecting an occupant in a seating location in the vehicle in a crash;

a second inflatable airbag structured and arranged to move the occupant in the seating location away from an interior surface of the vehicle upon inflation;

a crash sensor system arranged to determine that a crash involving the vehicle will occur or is occurring; and an occupant position sensor system coupled to said crash sensor system for determining the position of the occupant in the seating location, said second airbag being inflated prior to inflation of said first airbag when the occupant is determined to be improperly positioned for deployment of said first airbag such that inflation of said second airbag causes the occupant to be moved away from the interior surface of the vehicle and into a better position for deployment of said first airbag.

2. The vehicle of claim 1, wherein said first airbag is a side curtain airbag and said second airbag is arranged in a door, seat or side of the vehicle to move the occupant away from the door of the vehicle.

3. The vehicle of claim 1, wherein said crash sensor system comprises an anticipatory sensor.

4. The vehicle of claim 3, wherein said second airbag is inflated prior to a crash upon a determination by said anticipatory sensor that a crash involving the vehicle will occur based on data obtained prior to the crash.

5. The vehicle of claim 1, wherein said crash sensor system comprises a rollover sensor.

6. The vehicle of claim 1, further comprising a control unit coupled to said crash sensor system and said occupant sensor system for initiating inflation of said first and second airbags based on output from said crash sensor system and said occupant position sensor system.

7. The vehicle of claim 1, wherein said second airbag is arranged to inflate in a direction perpendicular to a direction of inflation of said first airbag.

8. The vehicle of claim 1, wherein said second airbag is inflated only when the occupant is determined to be improperly positioned for deployment of said first airbag.

9. A method for deploying airbags in a vehicle to protect a vehicle occupant, comprising the steps of:

determining that a crash involving the vehicle will occur or is occurring;

determining the position of the occupant;

inflating a first airbag to move the occupant away from an interior surface of the vehicle when the occupant is improperly positioned for deployment of a second airbag; and then or more slowly inflating the second airbag to protect the occupant from injury in the crash.

10. The method of claim 9, further comprising the steps of:

arranging the second airbag as a side curtain airbag along a side of the vehicle; and arranging the first airbag in a door, seat or side of the vehicle to move the occupant away from the door of the vehicle.

11. The method of claim 9, wherein the step of determining that a crash involving the vehicle will occur or is occurring comprises the step of determining that a crash will occur based on data obtained prior to the crash, the step of inflating the first airbag comprising the step of inflating the first airbag prior to the crash.

12. The method of claim 9, wherein the step of determining that a crash involving the vehicle will occur or is occurring comprises the step of determining that a rollover is occurring.

13. The method of claim 9, further comprising the steps of:

monitoring the position of the occupant after inflation of the first airbag; and suppressing inflation of the second airbag when the occupant is still improperly positioned for deployment of the second airbag after inflation of the first airbag.

14. The method of claim 9, further comprising the step of arranging the first and second airbags to deploy in perpendicular directions.

15. The method of claim 9, further comprising the steps of:

determining the position of the occupant; and controlling the timing between the inflation of the first and second airbags based on the position of the occupant.

16. The method of claim 9, further comprising the steps of:

determining a morphological property of the occupant; and controlling the timing between the inflation of the first and second airbags based on the determined morphological property of the occupant.

17. The method of claim 9, wherein the first airbag is inflated only when the occupant is improperly positioned for deployment of a second airbag.

18. A method for deploying a side curtain airbag in a vehicle to protect an occupant, comprising the steps of:

detecting a crush or rollover condition requiring deployment of the side curtain airbag;

determining the occupant's position;

determining whether the occupant is out of position for deployment of the side curtain airbag;

when the occupant is not out of position, deploying the side curtain airbag; and when the occupant is out of position, deploying a positioning airbag to move the occupant into a proper position for deployment of the side curtain airbag and then or more slowly deploying the side curtain airbag.

19. The method of claim 18, wherein the step of determining whether the occupant is out of position for deployment of the side curtain airbag comprises the step of determining whether the occupant is too close to the side of the vehicle along which the side curtain airbag will deploy.

20. The method of claim 18, further comprising the step of confirming that the occupant is moving toward the proper position for deployment of the side curtain airbag after deployment of the positioning airbag.

21. The method of claim 18, further comprising the steps of:

monitoring the position of the occupant after inflation of the positioning airbag; and suppressing inflation of the side curtain airbag when the occupant is still improperly positioned for deployment of the side curtain airbag.

22. The method of claim 18, further comprising the step of controlling the timing between the inflation of the positioning airbag and the side curtain airbag based on the position of the occupant.

23. The method of claim 18, further comprising the steps of:

determining a morphological property of the occupant; and controlling the timing between the inflation of the positioning airbag and the side curtain airbag based on the determined morphological property of the occupant.

24. In a motor vehicle, an apparatus for deploying airbags in a vehicle to protect occupants in the vehicle, comprising:

a plurality of protective airbags for protecting the occupants in a crash, each of said protective airbags being arranged to protect an occupant in a specific deployment area;

a plurality of positioning airbags each arranged to inflate prior to or in conjunction with the deployment of a respective one of said protective airbags, each of said positioning airbags being arranged to move the occupant away from an area in which the respective one of said protective airbags will deploy;

a crash sensor system arranged to determine that a crash involving the vehicle will occur or is occurring;

an occupant sensor system for determining the position of the occupant; and a control unit coupled to said crash sensor system, said plurality of protective airbags, said plurality of positioning airbags and said occupant sensor system and arranged to determine which of said protective airbags and said positioning airbags should be deployed in the crash based on the determined position of the occupant.

25. The vehicle of claim 24, wherein said protective airbags include a side curtain airbag and said positioning airbags include an airbag associated with said side curtain airbag and arranged in a door, seat or side of the vehicle to move the occupant away from the door upon inflation.

26. A vehicle including an apparatus for deploying multiple airbags, the vehicle having a front, rear and left and right sides and at least one seat, comprising.

a side curtain airbag arranged in a ceiling of a passenger compartment of the vehicle to deploy in a downward direction along the loft or right side of the vehicle and between a seating location above the seat and the left or right side of the vehicle;

a positioning airbag arranged below said side curtain airbag to deploy below said side curtain airbag and inward from a side door of the vehicle into the seating location above the seat; and a rollover sensor for determining that the vehicle is experiencing a rollover, said rollover sensor being coupled to said aide curtain airbag and said positioning airbag and arranged to initiate inflation of said side curtain airbag and said positioning airbag when the vehicle experiences a rollover.

27. The vehicle of claim 26, wherein said rollover sensor is arranged to initiate inflation of said positioning airbag prior to inflation of said side curtain airbag.

28. The vehicle of clam 26, wherein said positioning airbag is arranged in the side door of the vehicle or in a seat of the vehicle.

29. In a motor vehicle, an apparatus for deploying airbags in a vehicle to protect occupant in the vehicle, comprising:

a plurality of protective airbags for protecting the occupants in a crash;

a plurality of positioning airbag&s arranged to inflate to move an occupant in a desired direction into a deployment area of one of said protective airbags;

a crash sensor system arranged to determine that a crash involving the vehicle will occur or is occurring;

an occupant sensor system for determining the position of at least one of the occupants of the vehicle; and a control unit coupled to said occupant sensor system, said crash sensor system, said plurality of protective airbags and said plurality of positioning airbags and arranged to determine which of said positioning airbags should be deployed in the crash based on the position of at least one of the occupants in the vehicle.

30. The vehicle of claim 29, wherein said protective airbags include a side curtain airbag and said positioning airbags include an airbag associated with said side curtain airbag and arranged in a door, seat or side of the vehicle to move the occupant away from the door upon inflation.

31. The vehicle of claim 29, wherein said crash sensor system includes an anticipatory sensor for determining that a crash involving the vehicle will occur prior to the crash based on data obtained prior to the crash such that said positioning airbags are inflatable based on an anticipation of a crash.

32. The vehicle of claim 29, wherein said control unit is arranged to determine which of said protective airbags should be deployed in the crash based on the position of the occupants in the vehicle.

33. A vehicle including multiple airbags, comprising:

a side curtain airbag arranged to deploy in a downward direction along a left or right side of the vehicle and between a seating location above a seat and the left or right side of the vehicle;

a positioning airbag arranged to deploy inward from a door of the vehicle in conjunction with deployment of said side curtain airbag such that whenever said side curtain airbag is deployed, said positioning airbag is deployed;

a crash sensor for determining that the vehicle is experiencing a crash or rollover;

a control unit coupled to said side curtain airbag, said positioning airbag and said crash sensor for determining whether deployment of said side curtain airbag is necessary for the crash; and an activation mechanism coupled to said control unit and arranged to deploy said positioning airbag when said control unit determines that deployment of said side curtain airbag is necessary such that said control unit initiates deployment of both said side curtain airbag and said position airbag when it determines that deployment of said side curtain airbag is necessary, said control unit being arranged to initiate inflation of said side curtain airbag at a slower rate than inflation of said positioning airbag.

34. The vehicle of claim 33, wherein said crash sensor is arranged to determine that the vehicle is experiencing a rollover.

35. The vehicle of claim 33, wherein said control unit is arranged to initiate inflation of said aide curtain airbag before inflation of said positioning airbag.

36. The vehicle of claim 33, wherein said positioning airbag is arranged below said side curtain airbag to deploy below said side curtain airbag and inward from a side door of the vehicle into the seating location above the seat.

37. The vehicle of claim 33, wherein said side curtain airbag is arranged in a ceiling of a passenger compartment of the vehicle and said positioning airbag is arranged in the side door of the vehicle or in a seat of the vehicle.

38. A method for deploying airbags in a vehicle to protect a vehicle occupant, comprising the steps of:

determining that a crash involving the vehicle will occur or is occurring;

determining the position of the occupant;

inflating a first airbag to move the occupant away from an interior surface of the vehicle when the occupant is proximate or against the interior surface; then or more slowly inflating a second airbag to protect the occupant from injury in the crash; and controlling the timing between the inflation of the first and second airbags based on the position of the occupant.

39. A method for deploying airbags in a vehicle, comprising the steps of:

determining that a crash involving the vehicle will occur or is occurring;

determining a morphological property of the occupant;

inflating a first airbag to move an occupant away from an interior surface of the vehicle when the occupant is proximate or against the interior surface; then or more slowly inflating a second airbag to protect the occupant from injury in the crash; and controlling the timing between the inflation of the first and second airbags based on the determined morphological property of the occupant.

40. A vehicle including multiple airbags, comprising:

a side curtain airbag arranged to deploy in a downward direction along a left or right side of the vehicle and between a seating location above a seat and the left or right side of the vehicle;

a positioning airbag arranged to deploy inward from a door of the vehicle in conjunction with deployment of said side curtain airbag such that whenever said side curtain airbag is deployed, said positioning airbag is deployed, said positioning airbag being arranged below said side curtain airbag to deploy below said side curtain airbag and inward from a side door of the vehicle into the seating location above the seat;

a crash sensor for determining that the vehicle as experiencing a crash or rollover;

a control unit coupled to said side curtain airbag, said positioning airbag and said crash sensor for determining whether deployment of said side curtain airbag is necessary for the crash; and an activation mechanism coupled to said control unit and arranged to deploy said positioning airbag when said control unit determines that deployment of said side curtain airbag is necessary such that said control unit initiates deployment of both said side curtain airbag and said positioning airbag when it determines that deployment of said side curtain airbag is necessary.

41. A vehicle including multiple airbags, comprising:

a side curtain airbag arranged in a ceiling of a passenger compartment of the vehicle to deploy in a downward direction along a left or right side of the vehicle and between a seating location above a seat and the left or right side of the vehicle;

a positioning airbag arranged in a side door of the vehicle or in a seat of the vehicle to deploy inward from the side door of the vehicle in conjunction with deployment of said side curtain airbag such that whenever said side curtain airbag is deployed, said positioning airbag is deployed;

a crash sensor for determining that the vehicle is experiencing a crash or rollover;

a control unit coupled to said side curtain airbag, said positioning airbag and said crash sensor for determining whether deployment of said side curtain airbag is necessary for the crash; and an activation mechanism coupled to said control unit and arranged to deploy said positioning airbag when said control unit determines that deployment of said side curtain airbag is necessary such that said control unit initiates deployment of both said side curtain airbag and said positioning airbag when it determines that deployment of said side curtain airbag is necessary.

* * * * *

UNITED STATES PATENT AND TRADEMARK OFFICE
CERTIFICATE OF CORRECTION

PATENT NO. : 6,918,459 B2
DATED : July 19, 2005
INVENTOR(S) : David S. Breed

It is certified that error appears in the above-identified patent and that said Letters Patent is hereby corrected as shown below:

Title page,
Item [63], Related U.S. Application Data, after "Ser. No. 10/097,082, filed on Mar. 13, 2002,", insert -- now Pat. No. 6,755,273, --.

Column 1,
Line 7, after "Ser. No. 10/097,082 filed on Mar. 13, 2002", insert -- , now Pat. No. 6,755,273, --.
Line 24, after "Ser. No. 10/097,086 filed on Mar. 13, 2002", insert -- , now Pat. No. 6,749,218 --.

Signed and Sealed this

Sixth Day of September, 2005

JON W. DUDAS
*Director of the United States Patent and Trademark Office*